United States Patent
Wong et al.

(10) Patent No.: US 12,521,189 B2
(45) Date of Patent: Jan. 13, 2026

(54) ULTRASOUND ELONGATE INSTRUMENT SYSTEMS AND METHODS

(71) Applicant: INTUITIVE SURGICAL OPERATIONS, INC., Sunnyvale, CA (US)

(72) Inventors: Serena H. Wong, Los Altos, CA (US); Federico Barbagli, San Francisco, CA (US); Samuel Raybin, San Jose, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 1 day.

(21) Appl. No.: 18/688,637

(22) PCT Filed: Aug. 23, 2022

(86) PCT No.: PCT/US2022/041158
§ 371 (c)(1),
(2) Date: Mar. 1, 2024

(87) PCT Pub. No.: WO2023/034071
PCT Pub. Date: Mar. 9, 2023

(65) Prior Publication Data
US 2024/0350205 A1    Oct. 24, 2024

Related U.S. Application Data

(60) Provisional application No. 63/240,471, filed on Sep. 3, 2021.

(51) Int. Cl.
A61B 34/20    (2016.01)
A61B 8/00    (2006.01)
A61B 8/12    (2006.01)

(52) U.S. Cl.
CPC .............. *A61B 34/20* (2016.02); *A61B 8/12* (2013.01); *A61B 8/488* (2013.01); *A61B 2034/2061* (2016.02); *A61B 2034/2063* (2016.02)

(58) Field of Classification Search
CPC .... A61B 34/20; A61B 8/12; A61B 2034/2061
See application file for complete search history.

(56) References Cited

U.S. PATENT DOCUMENTS 6,389,187 B1    5/2002    Greenaway et al.
11,617,623 B2    4/2023    Hall et al.
(Continued)

OTHER PUBLICATIONS

Choe J.W., et al., "Volumetric Real-time Imaging Using a CMUT Ring Array," IEEE Transactions on Ultrasonics, Ferroelectrics, and Frequency Control, Jun. 2012, vol. 59 (6), pp. 1201-1211.
(Continued)

*Primary Examiner* — Rochelle D Turchen
(74) *Attorney, Agent, or Firm* — Haynes & Boone, LLP

(57) ABSTRACT

A system may include an elongate flexible device, a flexible instrument, and a processor. The elongate flexible device may include a first shape sensor configured to generate first shape data corresponding to a shape of the elongate flexible device. The flexible instrument may include a second shape sensor configured to generate second shape data corresponding to a shape of the flexible instrument. The processor may be configured to register the flexible instrument to the elongate flexible device based on the first shape data and the second shape data. The first shape data and the second shape data may be generated while the flexible instrument is mated with the elongate flexible device.

20 Claims, 16 Drawing Sheets

(56) References Cited

U.S. PATENT DOCUMENTS

| | | |
|---|---|---|
| 2006/0013523 A1 | 1/2006 | Childers et al. |
| 2008/0212082 A1 | 9/2008 | Froggatt et al. |
| 2009/0137952 A1* | 5/2009 | Ramamurthy ..... A61B 1/00004 604/95.01 |
| 2009/0299331 A1* | 12/2009 | Hoary .............. A61B 17/00008 604/523 |
| 2018/0235709 A1 | 8/2018 | Donhowe et al. |
| 2018/0240237 A1 | 8/2018 | Donhowe et al. |
| 2020/0214664 A1 | 7/2020 | Zhao et al. |
| 2020/0222666 A1 | 7/2020 | Chan et al. |
| 2022/0125527 A1 | 4/2022 | Hsu et al. |
| 2022/0273189 A1* | 9/2022 | Knutson .............. A61B 1/0051 |
| 2024/0081775 A1 | 3/2024 | Donhowe et al. |

OTHER PUBLICATIONS

International Search Report and Written Opinion for Application No. PCT/US2022/041158, mailed Jan. 30, 2023, 20 pages.

Invitation to Pay Additional Fees and Partial International Search Report for PCT/US2022/041158, mailed Dec. 9, 2022, 16 pages.

Khan F., et al., "Pose Measurement of Flexible Medical Instruments Using Fiber Bragg Gratings in Multi-Core Fiber," IEEE Sensors Journal, IEEE, USA, May 7, 2020, vol. 20 (18), pp. 10955-10962.

Shi C., et al., "Shape Sensing Techniques for Continuum Robots in Minimally Invasive Surgery: A Survey," IEEE Transactions on Biomedical Engineering, IEEE, USA, Aug. 2, 2017, vol. 64 (8), pp. 1665-1678.

Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

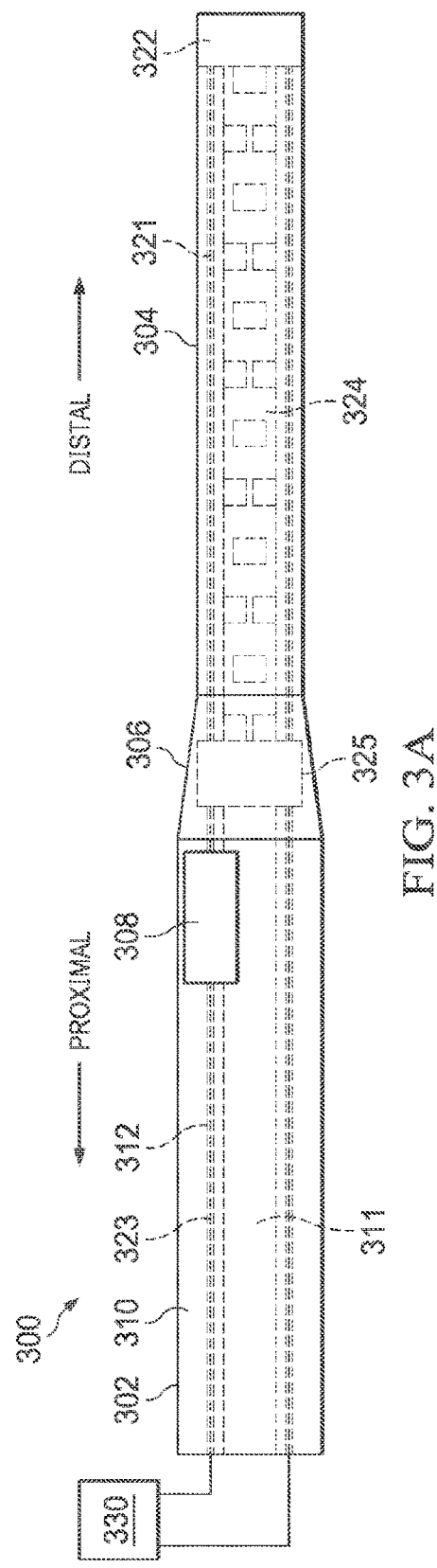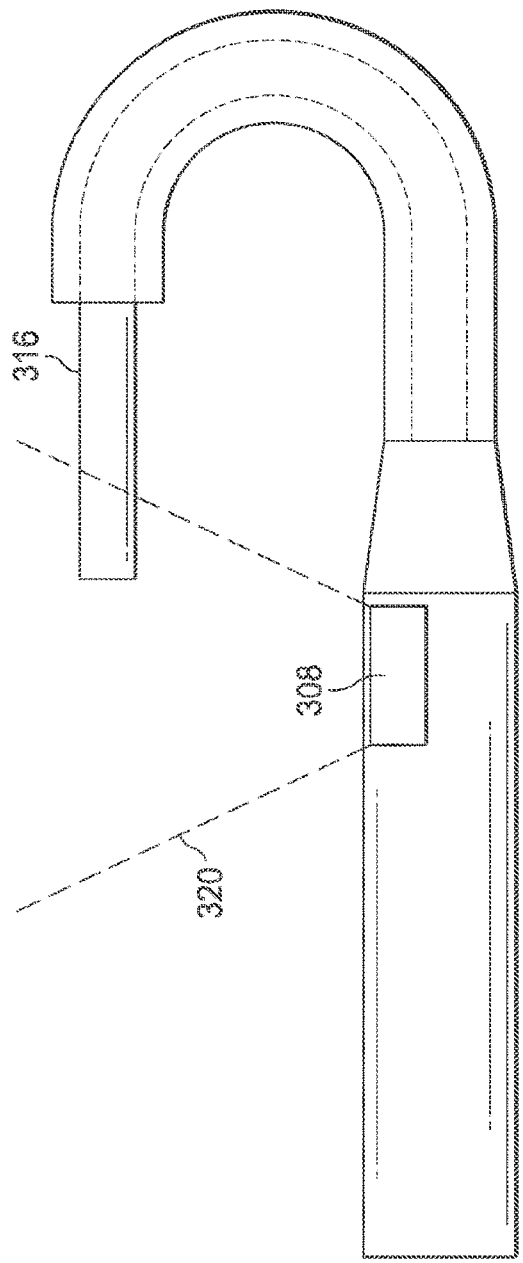

ULTRASOUND ELONGATE INSTRUMENT SYSTEMS AND METHODS

CROSS-REFERENCED APPLICATIONS

This application is the U.S. national phase of International Application No. PCT/US2022/041158, filed Aug. 23, 2022, which designated the U.S. and claims priority to and the benefit of U.S. Provisional Application No. 63/240,471, filed Sep. 3, 2021 and entitled "Ultrasound Elongate Instrument Systems and Methods," which are incorporated by reference herein in their entirety.

FIELD

The present disclosure is directed to systems and methods for planning and performing an image-guided procedure.

BACKGROUND

Minimally invasive medical techniques are intended to reduce the amount of tissue that is damaged during medical procedures, thereby reducing patient recovery time, discomfort, and harmful side effects. Such minimally invasive techniques may be performed through natural orifices in a patient anatomy or through one or more surgical incisions. Through these natural orifices or incisions, an operator may insert minimally invasive medical tools to reach a target tissue location. Minimally invasive medical tools include instruments such as therapeutic, diagnostic, biopsy, and surgical instruments. Medical tools may be inserted into anatomic passageways and navigated toward a region of interest within a patient anatomy. Navigation may be assisted using optical or ultrasound images of the anatomic passageways and surrounding anatomy, obtained pre-operatively and/or intra-operatively. Navigation may be further assisted using a three-dimensional anatomical model of the patient anatomy generated from pre-operative images.

Improved systems and methods are needed to register tools into common frames of reference and to update an anatomical model using intra-operative imaging.

SUMMARY

Consistent with some embodiments, a system may comprise an elongate flexible device, a flexible instrument, and a processor. The elongate flexible device may include a first shape sensor configured to generate first shape data corresponding to a shape of the elongate flexible device and the flexible instrument may include a second shape sensor configured to generate second shape data corresponding to a shape of the flexible instrument. The processor may be configured to register the flexible instrument to the elongate flexible device based on the first shape data and the second shape data. The first shape data and the second shape data may be generated while the flexible instrument is mated with the elongate flexible device along a length of the flexible instrument.

Consistent with some embodiments, a method may comprise generating first shape data with a first shape sensor of an elongate flexible device, generating second shape data with a second shape sensor of a flexible instrument, and registering the flexible instrument to the elongate flexible device based on the first shape data and the second shape data. The first shape data may correspond to a shape of the elongate flexible device and the second shape data may correspond to a shape of the flexible instrument while at least a portion of the flexible instrument is mated with the elongate flexible device.

Consistent with some embodiments, a system may comprise an elongate flexible device and a processor. The elongate flexible device may include an ultrasound imaging device and a localization sensor. The processor may be configured to register the elongate flexible device to an anatomical model of a patient and update the anatomical model with vasculature of the patient based on ultrasound data collected by the ultrasound imaging device.

Consistent with some embodiments, a method may comprise registering an elongate flexible device to an anatomical model of a patient. The elongate flexible device may comprise an ultrasound imaging device and a localization sensor. The method may further comprise updating the anatomical model with vasculature of the patient based on ultrasound data collected by the ultrasound imaging device.

Other embodiments include corresponding computer systems, apparatus, and computer programs recorded on one or more computer storage devices, each configured to perform the actions of the methods.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTIONS OF THE DRAWINGS

FIGS. 2A-3B illustrate elongate instruments with integrated imaging devices.

Figure 1:
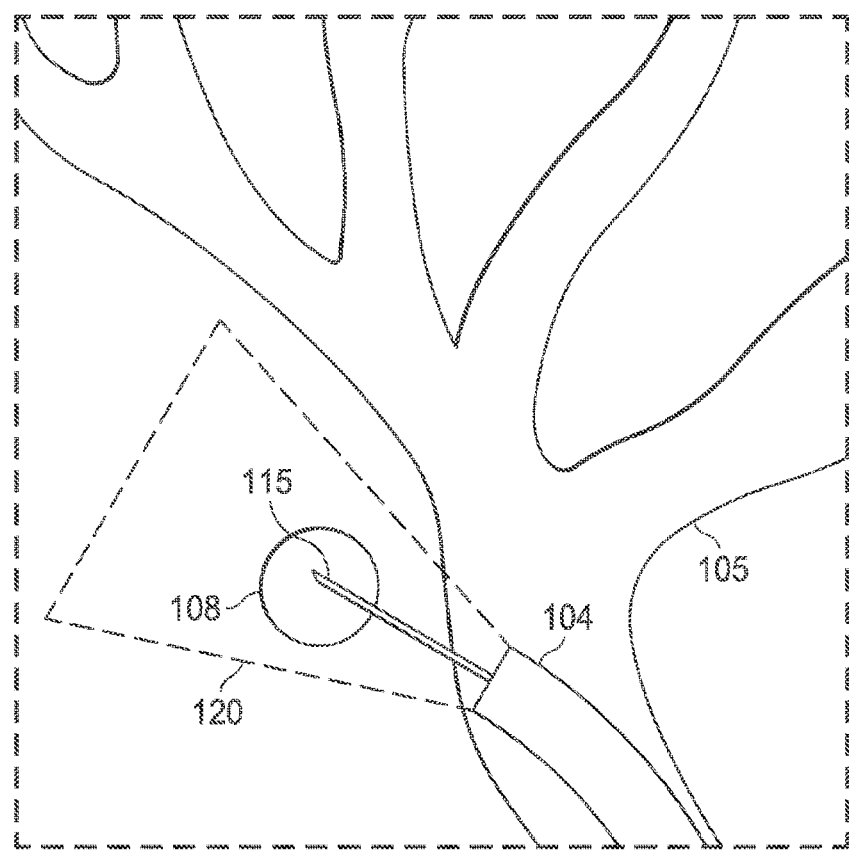
FIG. 1 illustrates an example of an elongate instrument in a patient anatomy near a target.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The techniques disclosed in this document may be used to enhance the workflow processes of minimally invasive procedures using intra-operative imaging, such as intra-operative ultrasound imaging. In some examples, imaging data may be utilized to verify real-time accurate placement of a treatment or diagnostic tool within an anatomical target during a medical procedure. For example, an imaging probe may be used to provide direct visual guidance of a tool as the tool is delivered via an elongate instrument or probe into a target.

FIG. 1 illustrates an example of an elongate instrument 104 positioned within passageways of a patient anatomy 105 (which as an example may be airways of a lung) near a target 108 which may be a lymph node or lesion in some examples. The elongate instrument may include a plurality of lumens for delivery of instruments, tools, devices, etc. In some embodiments, the elongate instrument may deliver an imaging probe via one of the plurality of lumens and/or may include an imaging device. The imaging transducers can be of any size or shape including moon, circles, rectangles, etc. In the illustrated example, the elongate instrument includes an integrated imaging device, e.g., an ultrasound or optical transducer array, capturing images in an imaging field 120 and a working lumen for delivery of a tool 115, such as a biopsy needle or treatment device. Since it can be beneficial to provide real time visualization of a tool positioned within a target, e.g., lesion, tumor, or nodule, to ensure accurate delivery of the tool within the target, the tool 115 may be delivered within the imaging field 120 of the imaging device for direct visualization of the tool into the target 108.

Figure 2A:
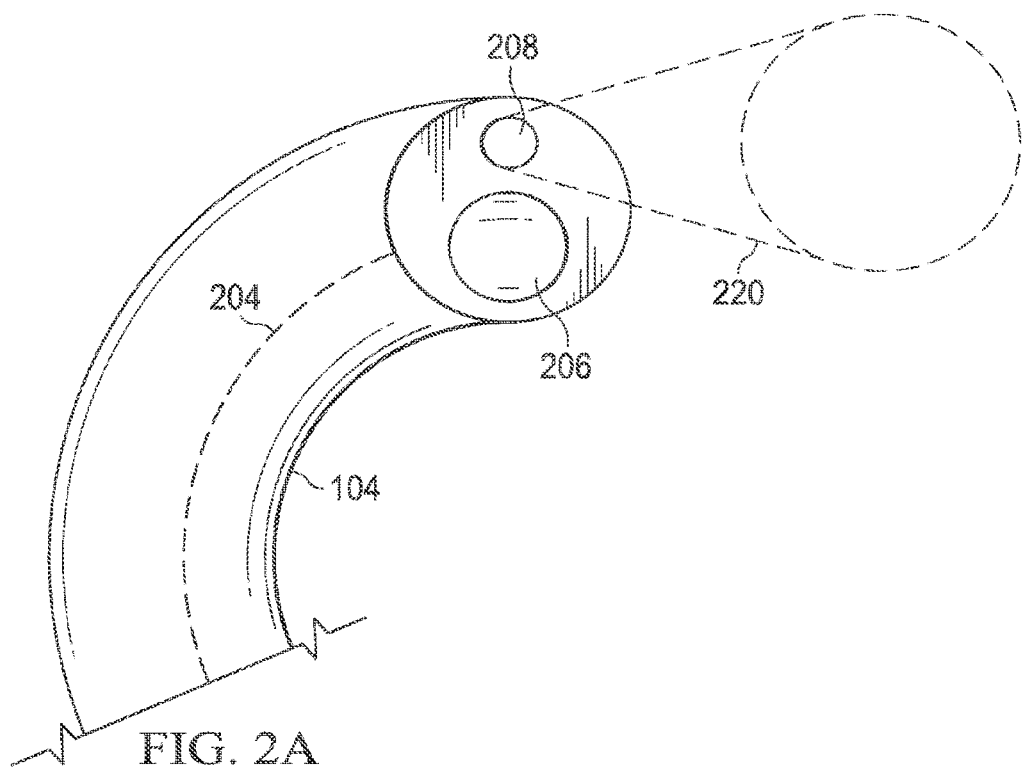
Figure 2B:
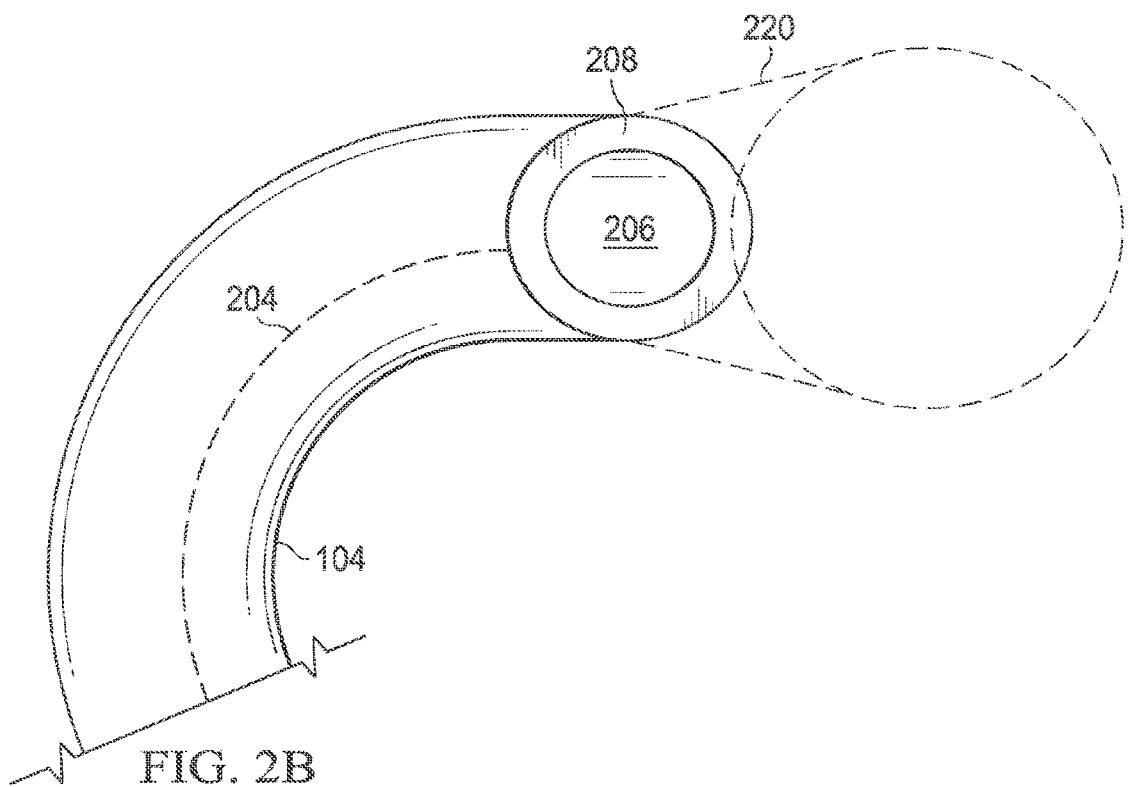

FIG. 2A illustrates an example of an elongate instrument 104 including a forward-facing ultrasound array 208 (comprising one or more transducers) configured to capture images in an imaging field 220 disposed distally of the distal end of the elongate instrument 104. In this regard, an instrument or tool may be extended from a working channel 206 of the elongate instrument 104 and into the imaging field 220. It should be appreciated that the term "forward-facing" as described herein encompasses ultrasound arrays with an imaging field that is directed at least partially forward (or distally) of the distal end of the device. This may include directly forward-facing ultrasound arrays which are oriented substantially parallel to the longitudinal axis of the instrument on which the array is disposed, forward angled ultrasound arrays which have an imaging field angled with respect to the longitudinal axis, or the like. Accordingly, in some embodiments utilizing a forward-facing ultrasound array for delivery of a needle, the needle tip can be oriented with respect to an array in a manner causing the needle to appear as a point or similar to a point in the images. In order to visualize a larger portion of the needle, the tip of the elongate instrument or portions of an ultrasound array can be angled, beveled, or shaped in a variety of ways to provide one or both direct axial and lateral images. In one example, the distal section of the tip containing the ultrasound array may be toe beveled or angled. In the illustrated example of FIG. 2B, the imaging device is a forward-facing ring ultrasound array 208 that can collect a full 3D volume ahead of the array. In the illustrated embodiment of FIG. 2B, the ring ultrasound array surrounds a working channel 206 of the elongate instrument 104. An instrument or tool may be extended through the working channel 206 and into the imaging field 220. It is contemplated that an imaging probe, ablation device, biopsy tool (e.g., needle), therapeutic delivery tool, irrigation, suction, or any other suitable medical treatment tool may be provided to the distal end of the elongate instrument 104 via the working channel 206 of FIGS. 2A-2B. The size and placement of the array elements can be adjusted to optimize imaging parameters, such as resolution or minimize grating lobes from a small array.

FIG. 3A illustrates an example of a flexible elongate instrument 300 with an integrated side-facing/side-firing imaging transducer 308. Examples of similar flexible elongate instruments are described in U.S. patent application Ser. No. 16/632,128 filed Jan. 17, 2020 (disclosing "Flexible Elongate Device Systems and Methods"), which is incorporated by reference herein in its entirety. In this example, the flexible elongate instrument 300 can include a flexible body 310 with a flexible wall having a thickness extending from an inner surface to an outer surface of the flexible body 310. A plurality of control element lumens 312 can extend through the flexible wall of the flexible body 310 arranged circumferentially in the flexible wall around a main lumen 311. Within each of the control element lumens 312, a coil pipe or conduit 323 can extend through a proximal section 302 of the flexible body 310, providing channels through which a plurality of control elements 321 extends. In some examples, control elements 321 can include pull wires, tendons, push rods and/or the like. The conduits 323 terminate at a stopper 325 in the transition section 306 between the proximal section 302 and a distal section 304 of the flexible elongate instrument 300. The control elements 321 extend out of the conduits 323, entering the distal section 304 through control element lumens 312, and attach to a distal mount 322. The distal section 304 may optionally include an axial support structure 324 which supports the distal section 304 against axial loads but which bends in response to unequal actuation forces in the control elements 321. In this regard, the one or more control elements 321 can be used to actuate or articulate distal section 304 of flexible elongate instrument 300 using one or more actuators 330. Because the conduits 323 terminate at an intermediate location along the length of the flexible body, articulation forces may be transferred to the distal end of the conduits 323 resulting in a bending of the flexible elongate instrument 300 as shown in FIG. 3B.

In some examples, the ultrasound transducer 308 can be embedded within or otherwise fixedly coupled to the flexible wall of the flexible body 310. A main lumen 311 can extend within the flexible body 310, through the proximal section 302 and a distal section 304. The main lumen 311 can provide a delivery channel for a medical tool 316, such as an endoscope, biopsy needle, endobronchial ultrasound (EBUS) probe, ablation tool, chemical delivery tool, and/or the like, to be inserted through flexible body 310. The elongate flexible instrument 300 may be articulated and oriented in a configuration as shown in FIG. 3B such that when a medical tool is inserted beyond a distal end of the elongate flexible device towards an and/or into an anatomical target, the medical tool is extended into a field of view 320 of the ultrasound transducer. Accordingly, the medical tool may be visualized in real time during insertion into the anatomical target.

In the example illustrated in FIGS. 3A and 3B, the imaging transducer 308 is positioned within the proximal section 302 of the flexible body 310. In alternative examples (not shown), the imaging transducer may be positioned within the distal section 304 of the flexible body at a location along the distal section which provides for visualization of the medical tool when inserted into the field of view 320. In further embodiments, the flexible body does not include discrete distal and proximal sections defined by conduits or an axial support structure. In such embodiments, the transducer is positioned at a location along a length of a flexible body which allows for the flexible body to be articulated into a configuration which provides for real time visualization of a medical instrument delivered through a lumen of the flexible body.

In the example illustrated in FIGS. 3A and 3B, the imaging transducer 308 is an ultrasound transducer side-facing/side-firing transducer providing the field of view 320. Because the transducer 308 is at a fixed circumferential location of the flexible elongate instrument 300, the flexible elongate instrument 300 must be rotated to an angular position where the imaging transducer 308 is facing the anatomical target. In one example, the flexible elongate instrument 300 may be rotated until the anatomical target is visible in the ultrasound image. In another example, the flexible elongate instrument 300 may include an integrated localization sensor (e.g., a fiber shape sensor, EM sensor, or plurality of EM sensors as will be described in further detail below) positioned at a fixed location relative to the imaging transducer 308. Using localization data and a navigational guidance described in more detail with reference to FIG. 8 below, the flexible elongate instrument 300 may be rotated to an angular position where the imaging transducer 308 is facing the anatomical target.

In alternative examples (not shown) the imaging transducer is a flexible ultrasound phased array or a synthetic aperture positioned around a full circumference of a flexible body of a flexible elongate instrument. For the phased array, in order to direct the ultrasound energy in a desired direction, the elements of the transducer array are fired a desired phase or time delay. In some embodiments, the phase or time delay can be calculated from a desired focal point/beam pattern. In a similar manner described above, the flexible elongate instrument may include a localization sensor positioned at a circumferential position offset from a longitudinal central axis from the flexible body, at a known location relative to the ultrasound phased array. Accordingly using localization data and navigational guidance, the firing sequence of the ultrasound elements may be set to direct the ultrasound energy towards an anatomical target, thus providing a field of view of the anatomical target without rotating the flexible elongate instrument.

Figure 4A:
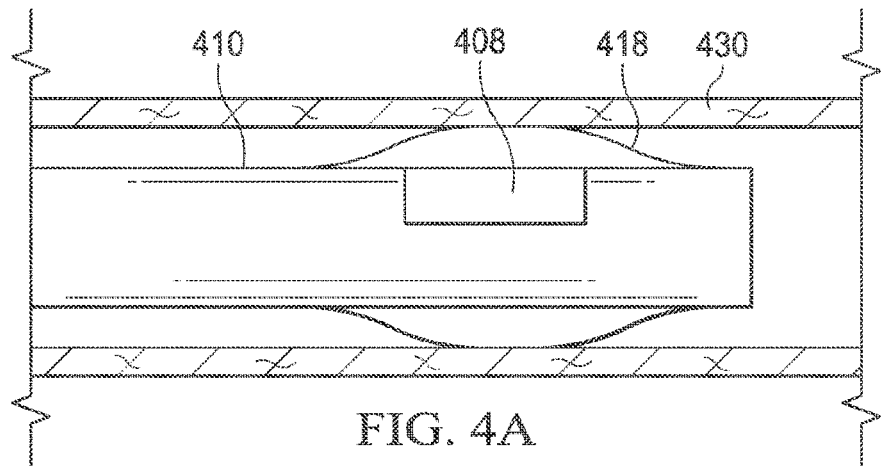
FIGS. 4A-4B illustrate imaging probes with inflatable balloons.
Figure 4B:
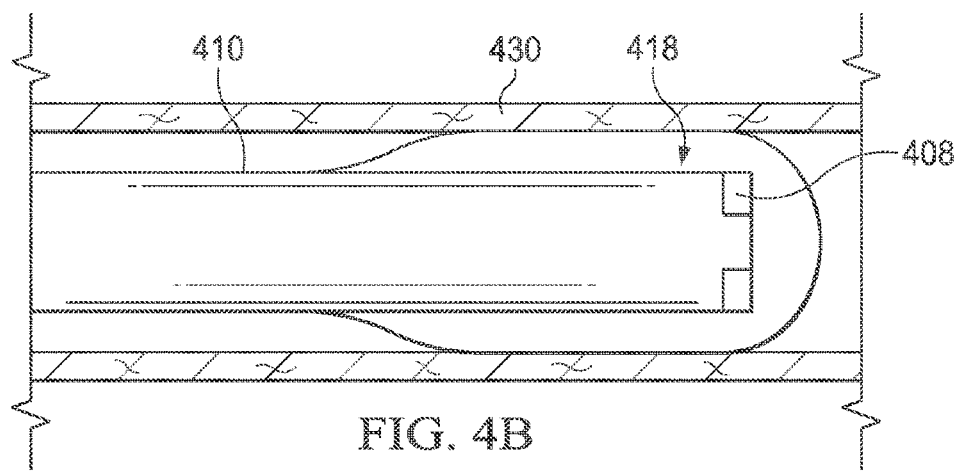

With ultrasound imaging, it is often desirable to minimize the volume of air and other gases between an ultrasound array and tissue which is to be imaged. Accordingly, a variety of balloons or inflatable/expandable fluid containing devices can optionally be used to ensure fluid contact. For example, as illustrated in FIGS. 4A-4B, a balloon 418 is shown adjacent to or around the distal end of the device 410 (which may be an example of any elongate instrument, sheath, or imaging probe discussed herein). The balloon 418 may be inflated with a coupling fluid to expand the balloon into contact with the surrounding tissue of an anatomical passageway 430 to park or secure the device 410 in place and/or to fill the space between the imaging device 408 and tissue that is to be imaged with a fluid that is conducive to imaging.

In some embodiments configured for side-facing/side-firing imaging as illustrated in FIG. 4A, an ultrasound array or other imaging device 408 may be disposed within inflatable balloon 418 and the inflatable balloon may be inflated with a fluid that is conducive to the applicable imaging medium, thereby reducing the volume of air or other gases between the imaging device and the wall of the anatomical passageway 430. Inflating the balloon 418 in this manner may also park the device 410 to secure it in a desired location within the passageway.

In some embodiments configured for forward-facing imaging, it can be difficult to ensure good contact between a ring ultrasound array or other imaging device at a distal end of the device and adjacent tissue. Accordingly, in the example shown in FIG. 4B, an inflatable balloon 418 may extend around the distal end of the device 410. In this regard, after the distal end of the device 410 has been driven near to or into contact with tissue, the balloon 418 may be inflated with a fluid to fill the space between the imaging device 408 at the distal end of the device 410 and the tissue. At the same time, the balloon 418 may expand laterally into contact with tissue such as a wall of an anatomical passageway 430 to park the device 410.

In some examples, an inflatable balloon may also be used to seal a passageway such as anatomical passageway 430 for suction or insufflation through the device 410. In this regard, a balloon such as balloon 418 of FIGS. 4A-4B may be used to block a passageway so that air may be suctioned from a portion of the passageway distal to the device, thereby collapsing the passageway. As an alternative to collapsing the passageway, a fluid or imaging gel may be injected into a portion of the passageway distal to the device after inflating the balloon, thereby filling the portion of the passageway with a medium that is conducive to imaging. Collapsing the passageway or filling the passageway with fluid as described may eliminate or reduce any volume of air which otherwise may hinder imaging quality.

In some examples, a balloon may be used to retain an imaging device in direct contact with tissue. For example, in the case of a side-facing/side-firing imaging device, a balloon on one side of an instrument may be inflated to push the instrument laterally into contact with tissue. In this regard, an imaging device on an opposing side of the instrument from the balloon may be forced into direct contact with the tissue. In another example, in the case of a forward-facing imaging device, the imaging device at the distal end of the instrument may be driven into direct contact with tissue to be imaged. Then a balloon extending radially around the instrument may be inflated into contact with surrounding tissue to secure the instrument in place. For example, the radially extending balloon 418 of FIG. 4A could be used with the forward-facing ultrasound array or other imaging device 408 of FIG. 4B.

In this regard, it should be appreciated that an inflatable balloon may be beneficial for use with any forward-facing imaging array or side-facing/side-firing imaging array discussed herein.

Figure 5:
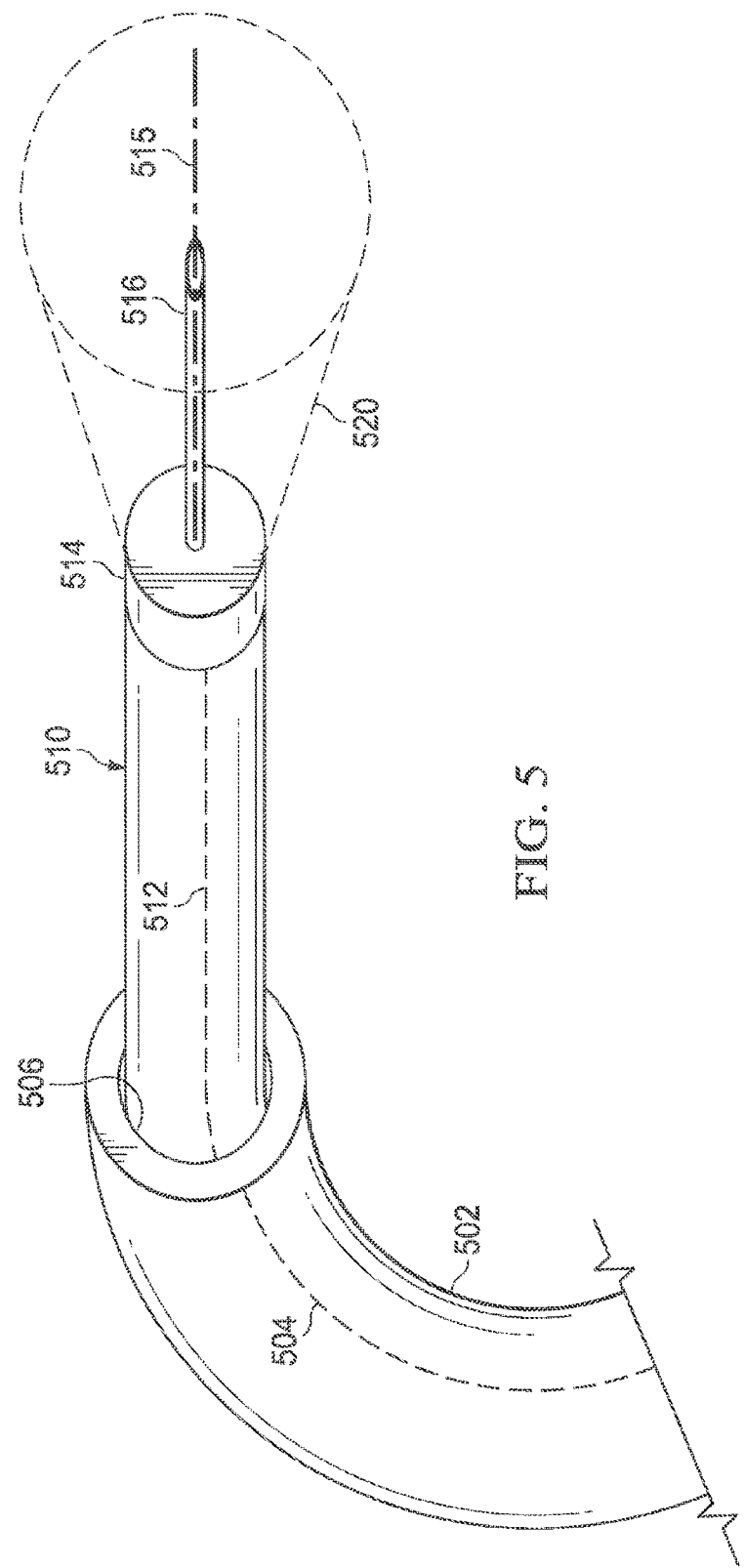
FIG. 5 illustrates an elongate instrument and a forward-facing imaging probe.

FIG. 5 illustrates another example of an elongate instrument 502 and an imaging probe 510 delivered through a working lumen 506 of the elongate instrument 502, allowing for real time visualization of a tool 516. In this regard, the imaging probe 510 is mated with the elongate instrument 502 along a length of the imaging probe 510 which is disposed within the working lumen 506 such that the imaging probe may rotate or longitudinally translate but is substantially restricted from lateral translation with respect to the elongate instrument 502. The elongate instrument 502 may comprise a shape sensor 504 to provide shape data regarding a shape of at least a portion of the elongate instrument 502. The imaging probe 510 may comprise a shape sensor 512 to provide shape data regarding a shape of at least a portion of the imaging probe 510. A forward-facing ultrasound array 514 may capture images in an imaging field 520 extending distally from a distal end of the imaging probe 510. An extendable and retractable tool 516, such as a biopsy needle, a therapeutic needle, an ablation device, or any other diagnostic or therapeutic tool, may extend distally from a lumen or working channel of the imaging probe 510 and into the imaging field 520 for direct imaging of the tool.

Figure 6:
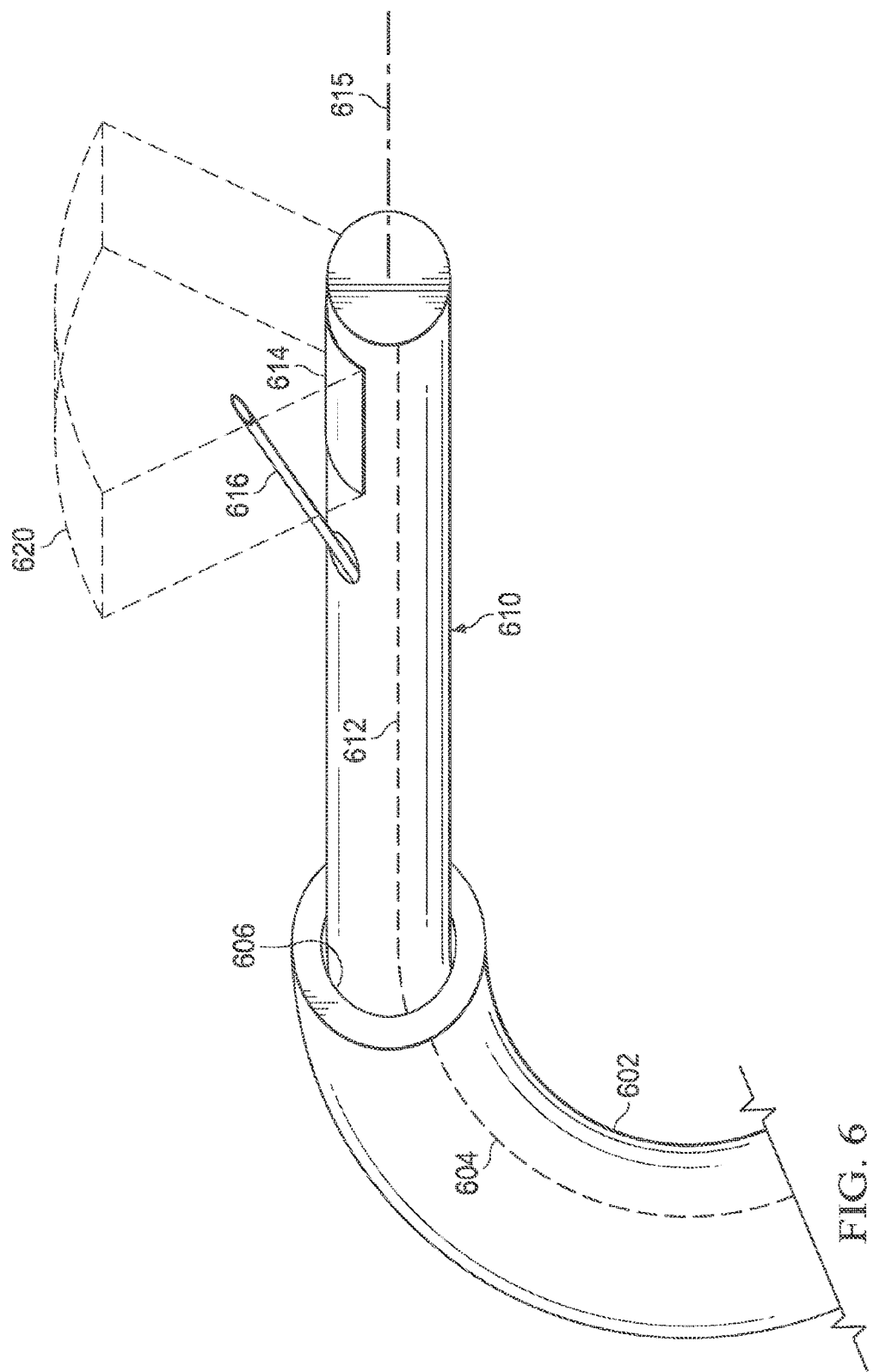
FIG. 6 illustrates an elongate instrument and a side-facing imaging probe with an instrument port.

FIG. 6 illustrates an elongate instrument 602 and an imaging probe 610. The imaging probe 610 may extend from a working channel 606 of the elongate instrument 602. The elongate instrument 602 may comprise a shape sensor 604 to provide shape data regarding a shape of at least a portion of the elongate instrument 602. The imaging probe 610 may comprise a shape sensor 612 to provide shape data regarding a shape of at least a portion of the imaging probe 610. A side-facing or side-firing imaging device such as ultrasound array 614 may capture images in an imaging field 620 extending laterally from a side of the imaging probe 610. The imaging probe 610 may further comprise a side port for an extendable and retractable tool 616, such as a biopsy needle, a therapeutic needle, an ablation tool, or any other suitable diagnostic or therapeutic tool, which may extend from the side port and into the imaging field 620 for direct imaging of the tool.

In an alternative example (not shown), a rapid-exchange side port may extend through a side wall of the elongate instrument 602. Such a side port may be provided in addition to or as an alternative to the port of imaging probe 610 through which the tool 616 may be extended. In this regard, a tool may be extended from the elongate instrument 602 and into the imaging field 620 of the imaging probe 610.

In a further alternative example (not shown), the working channel of elongate instrument 602 may open through a side wall of the elongate instrument such that the imaging probe 610 may extend through the side wall of the elongate instrument 602 as opposed to the distal end of the elongate instrument as illustrated.

Figure 7:
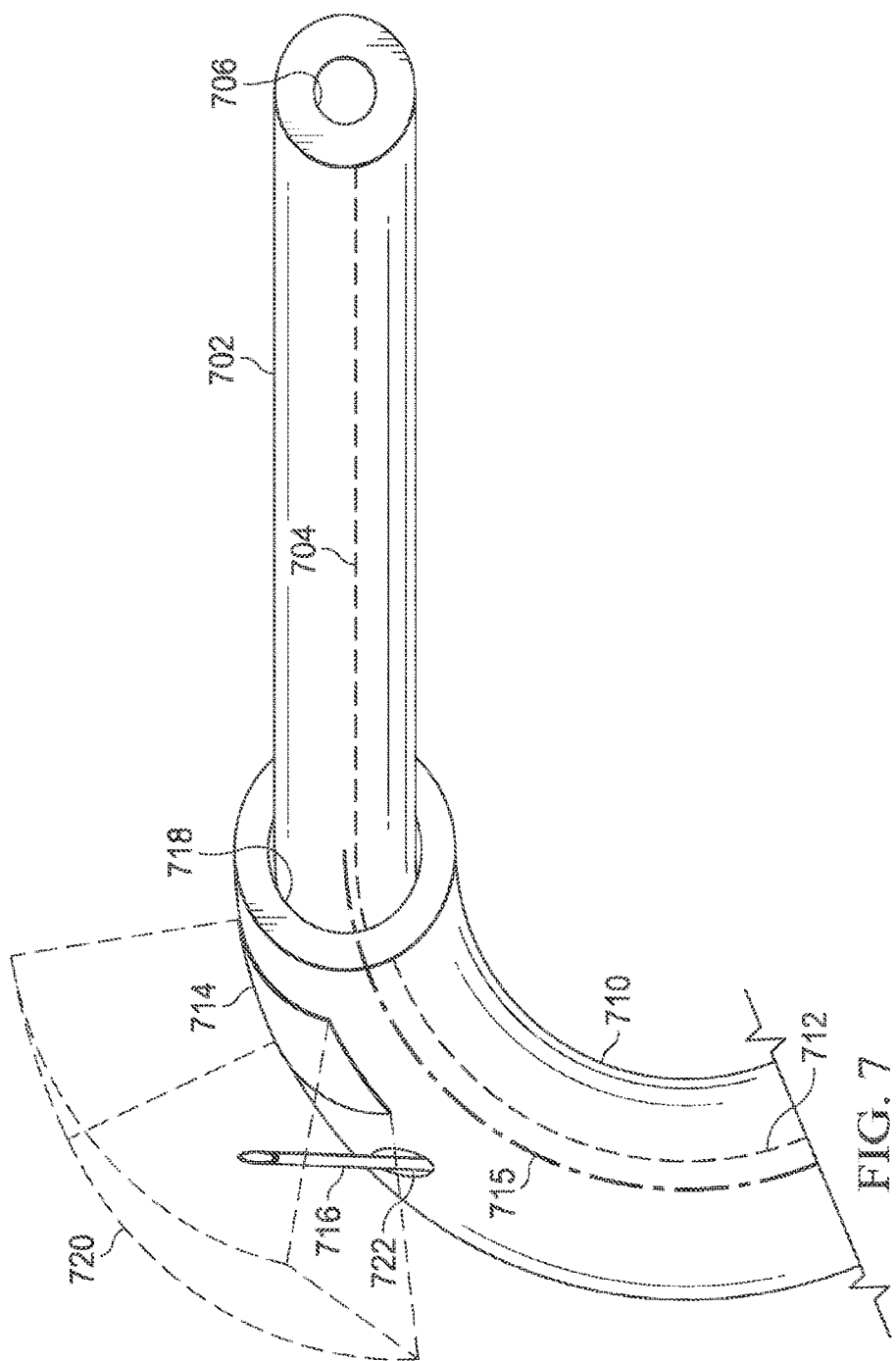
FIG. 7 illustrates an elongate instrument and a sheath with an integrated side-facing imaging device.

FIG. 7 illustrates a sheath 710 with an integrated side-facing/side-firing ultrasound array 714 and an elongate instrument 702 extending from a working channel 718 of the sheath 710. In this regard, the elongate instrument 702 is mated with the sheath 710 along a length of the elongate instrument 702 which is disposed within the working channel 718 such that the elongate instrument may rotate or longitudinally translate but is substantially restricted from lateral translation with respect to the sheath. It will be appreciated that the sheath 710 may also be considered an "imaging probe" as that term is used herein. The elongate instrument 702 may comprise a working channel 706 to receive retractable and extendable diagnostic and therapeutic instruments and may also comprise a shape sensor 704 to provide shape data regarding a shape of at least a portion of the elongate instrument 702. The sheath 710 may comprise a shape sensor 712 to provide shape data regarding a shape of at least a portion of the sheath 710. The sheath 710 may further comprise a side port 722 for an extendable and retractable tool 716, such as a biopsy needle, a therapeutic needle, an ablation device, an imaging probe, or any other suitable diagnostic or therapeutic tool, which may extend from the side port 722 and into the imaging field 720 for direct imaging of the tool.

In some examples, where direct visualization of a tool delivery into target anatomy is not readily available, an imaging probe may be delivered through an elongate instrument during positioning of the elongate instrument proximal to a target such that an imaging device of the imaging probe may be used to capture imaging data. Once the elongate instrument is adequately positioned with respect to the target, it may be parked in place and the imaging probe may then be removed from the elongate instrument to allow for delivery of a tool to the target anatomy. In such examples, the imaging data can be used to refine locations of an instrument, update an anatomic structure, or update a target location in an anatomic model as will be described in detail below.

Figure 8:
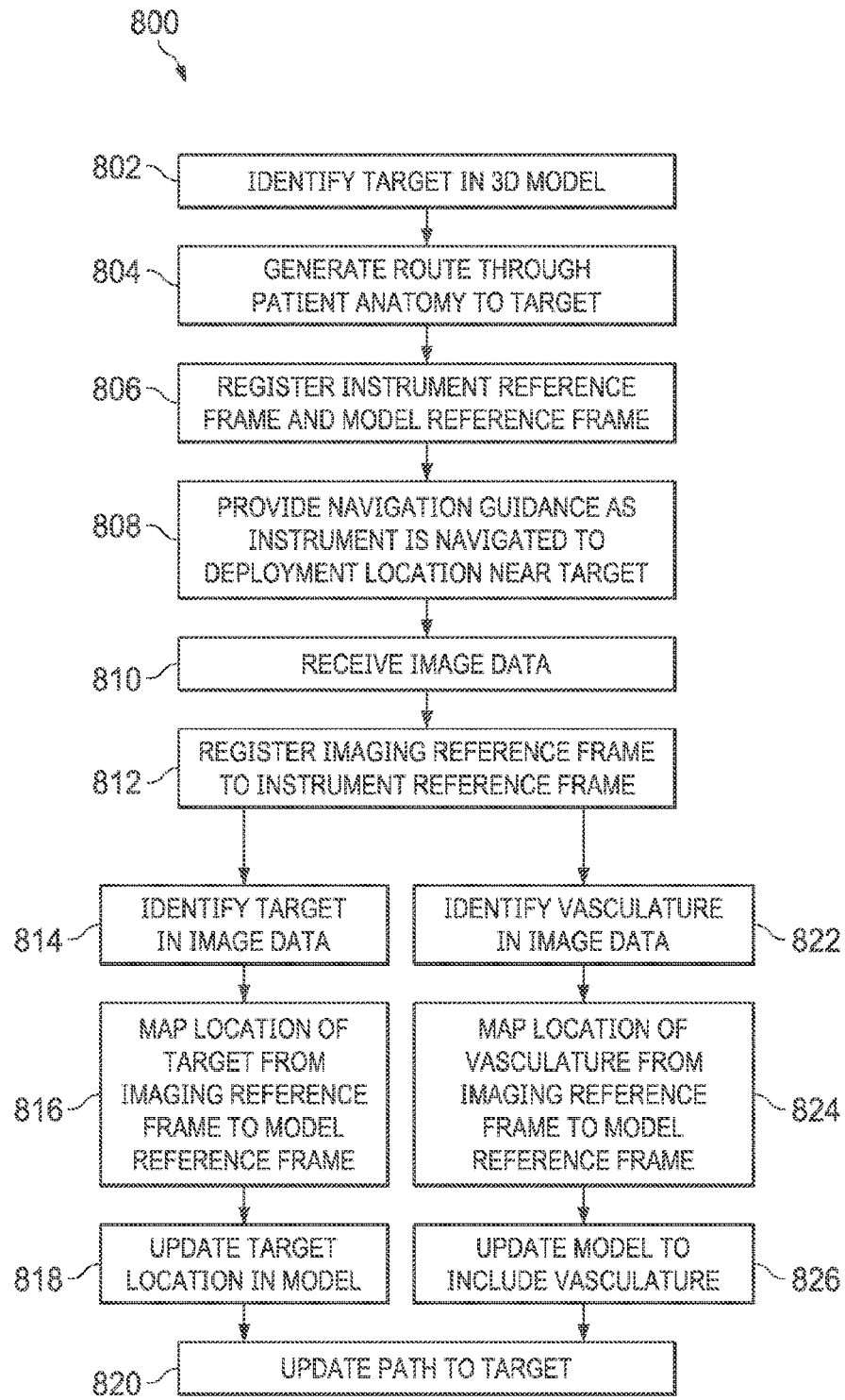
FIG. 8 illustrates a flowchart of a method of updating a location of an anatomic structure in a model.

FIG. 8 illustrates a flowchart of an example of a method 800 for performing a minimally invasive procedure in accordance with some aspects of the present disclosure. Image data may be captured and used to generate a three-dimensional model of anatomical structures of a patient, for example, by a control system. Imaging technology such as computerized tomography (CT), magnetic resonance imaging (MRI), fluoroscopy, thermography, ultrasound, optical coherence tomography (OCT), thermal imaging, impedance imaging, laser imaging, nanotube X-ray imaging, and/or the like may be used to capture the model image data. For example, a CT scan of the patient's anatomy may be performed pre-operatively or intra-operatively and the resulting image data may be used to construct a 3D model which may be displayed to a user. The 3D model may be updated based on imaging data captured by the imaging probe after the imaging reference frame is registered to the elongate instrument (e.g., catheter) reference frame.

Figure 9:
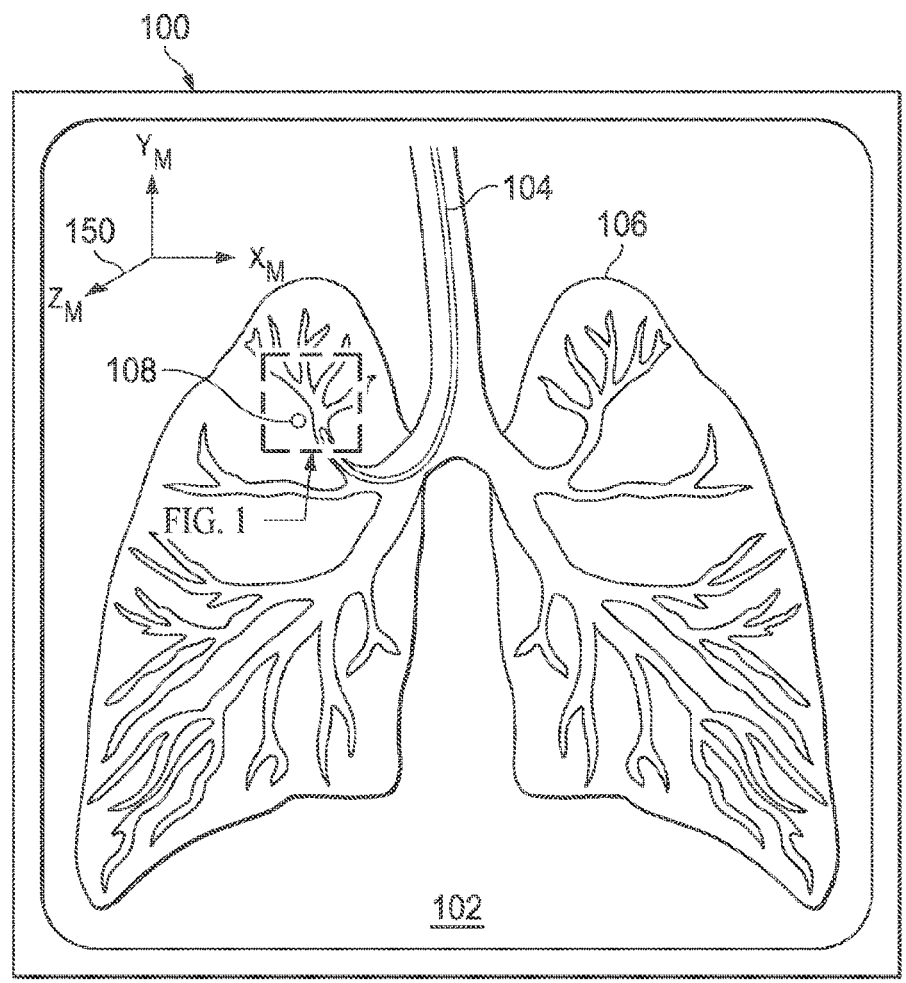
FIG. 9 illustrates a display system displaying an image of a medical instrument registered to an anatomic model.

FIG. 9 illustrates a virtual anatomic model 106 that may be generated from a pre-operative or intra-operative CT scan or other medical imaging modality taken of the patient anatomy, including patient anatomy 105 of FIG. 1 in the illustrated example. The anatomic model 106 may include the target 108, such as a lesion or nodule of interest which the procedure is intended to address (e.g., biopsy, treat, view, etc.). In some embodiments, as illustrated in FIG. 9, the display system 100 may present a global perspective of the anatomic model 106 including a virtual representation of the elongate instrument 104, including updating, based on data from a sensor system (e.g., sensor system 1508 of FIG. 15), a position and orientation of the elongate instrument in real-time as it is navigated through patient anatomy. In some embodiments (not shown) the virtual navigational image 102 may present a physician with a virtual image of the internal surgical site from a viewpoint of the elongate instrument 104, for example, from a distal tip of elongate instrument 104. As with the global perspective view, the viewpoint displayed from the viewpoint of the elongate instrument 104 can update as the elongate instrument 104 location is altered within patient anatomy.

Referring back to FIG. 8, at a process 802, a target such as a lesion, nodule, lymph node, or other tissue of interest for investigation or treatment may be identified. The target may be automatically identified by a control system and confirmed by a user or may be visually identified by the user and manually selected or indicated in the 3D model, for example, through a display system (e.g., display system 100 of FIG. 9). At process 804, a route through anatomic passageways formed in the anatomic structures is generated. The route may be generated automatically by the control system, or the control system may generate the route based on user inputs. The route may indicate a path along which an elongate instrument (e.g., elongate instrument 104 of FIG. 1) may be navigated into close proximity with the target. In some embodiments, the route may be stored in a control system and incorporated into the images displayed on display system.

Figure 15:
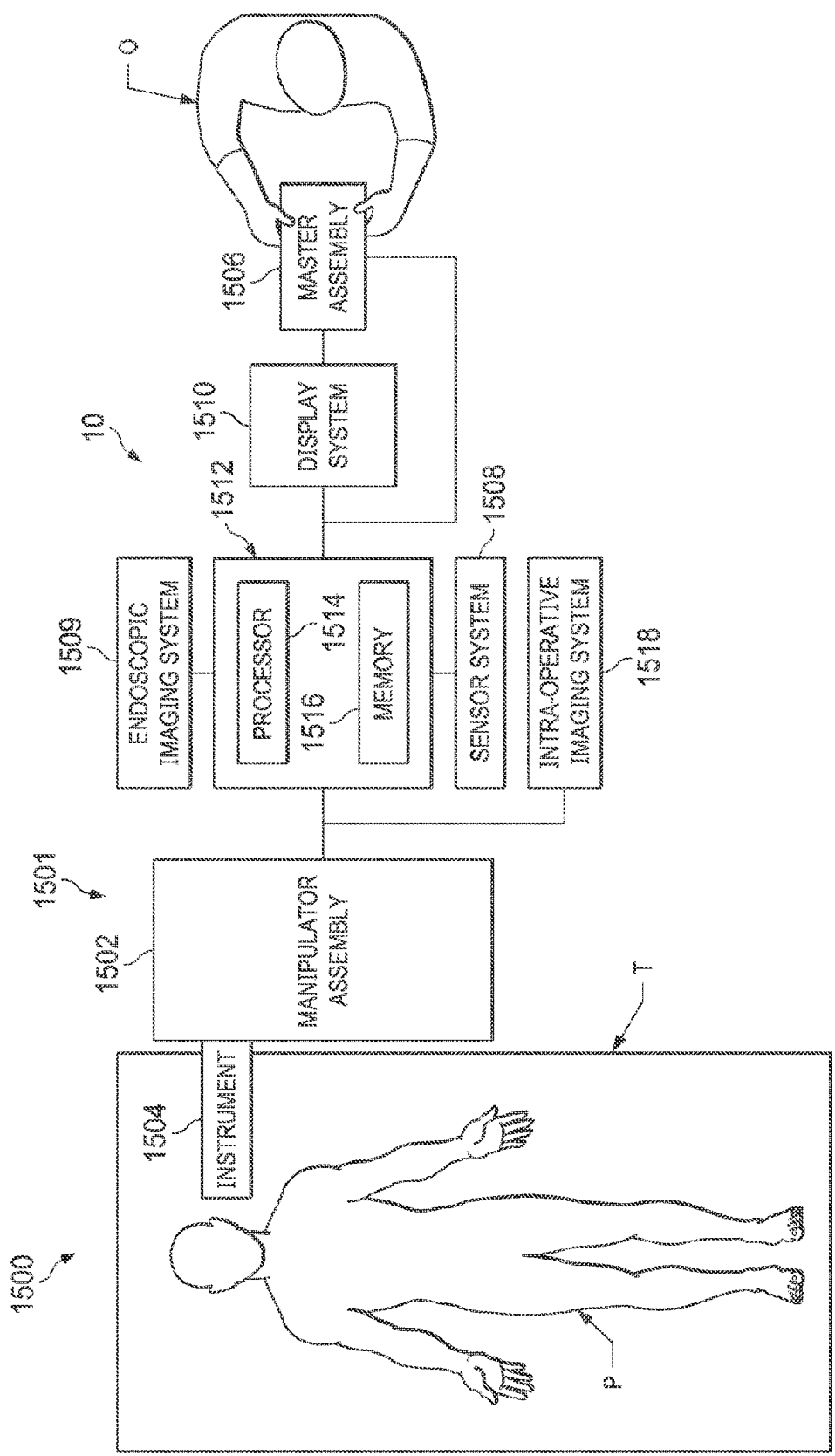
FIG. 15 illustrates a simplified diagram of a robot-assisted medical system according to some embodiments.
Figure 16:
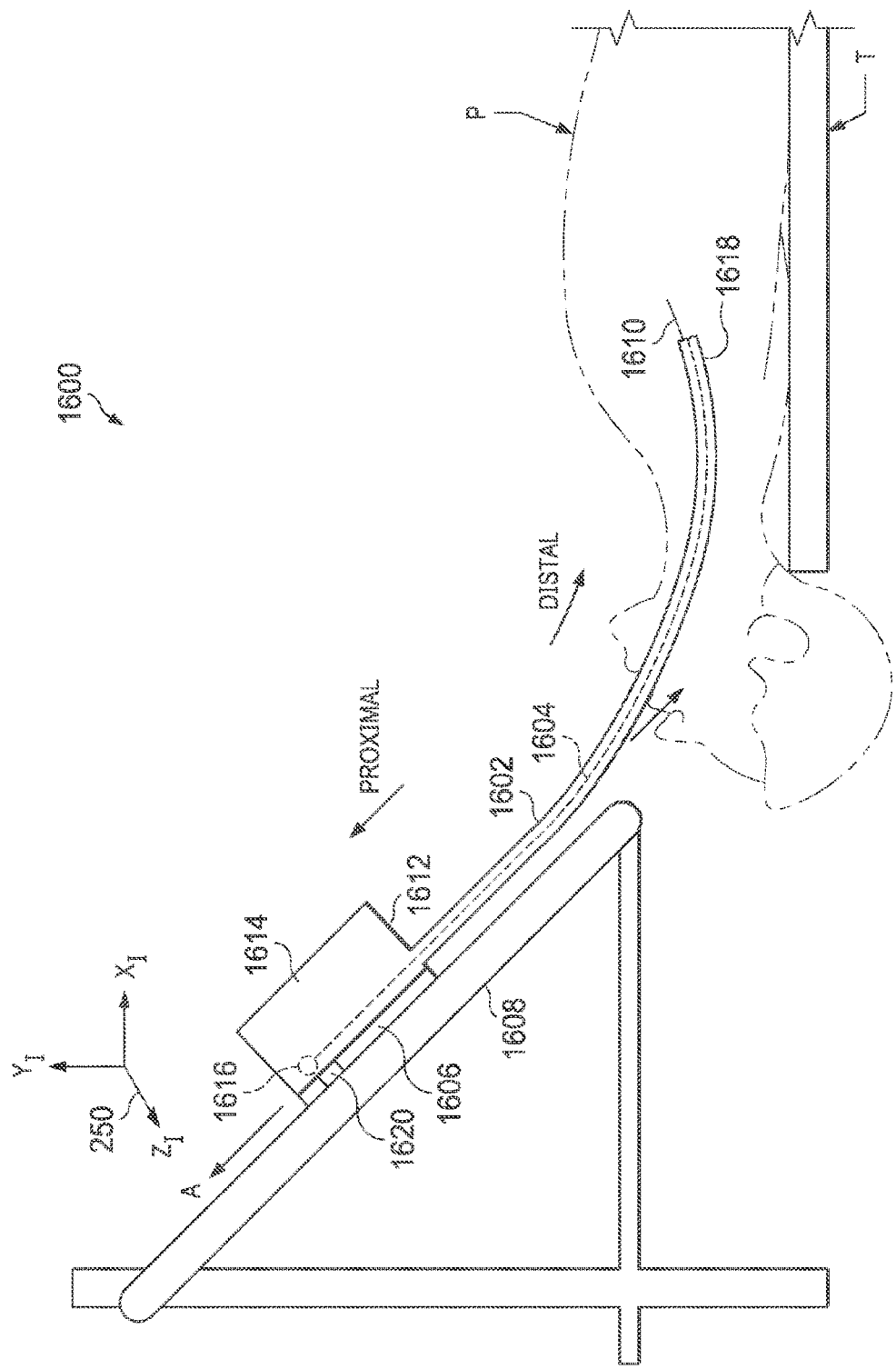
FIG. 16 illustrates a simplified diagram of a medical instrument system according to some embodiments.

In order to provide real time updates of the elongate instrument 104 of FIG. 9 within the anatomic model 106, the anatomic model 106 which is within a model reference frame ($X_M$, $Y_M$, $Z_M$) 150 must be registered to a surgical reference frame of the anatomy and/or an instrument/catheter/sensor reference frame ($X_I$, $Y_I$, $Z_I$) of the elongate instrument 104 (e.g., instrument reference frame 250 as shown in FIG. 16) at process 806. For example, the elongate instrument may include a sensor system (e.g., sensor system 1508 of FIG. 15) including a sensor or plurality of sensors which may include an optical fiber shape sensor or a plurality of localization sensors extending within and aligned with elongate instrument (e.g., elongate instrument 1602 of FIG. 16). In one embodiment, an optical fiber forms a fiber optic bend sensor for determining the shape of the elongate instrument. In one alternative, optical fibers including Fiber Bragg Gratings (FBGs) are used to provide strain measurements in structures in one or more dimensions. Various systems and methods for monitoring the shape and relative position of an optical fiber in three dimensions are described in U.S. patent application Ser. No. 11/180,389 (filed Jul. 13, 2005) (disclosing "Fiber optic position and shape sensing device and method relating thereto"); U.S. patent application Ser. No. 12/047,056 (filed on Jul. 16, 2004) (disclosing "Fiber-optic shape and relative position sensing"); and U.S. Pat. No. 6,389,187 (filed on Jun. 17, 1998) (disclosing "Optical Fiber Bend Sensor"), which are all incorporated by reference herein in their entireties. Sensors in some embodiments may employ other suitable strain sensing techniques, such as Rayleigh scattering, Raman scattering, Brillouin scattering, and Fluorescence scattering. In some embodiments, the shape of the elongate instrument may be determined using other techniques. For example, a history of the distal end pose of elongate instrument can be used to reconstruct the shape of elongate instrument over the interval of time. In some embodiments, a shape sensor may comprise a plurality of position sensors (such as electromagnetic position sensors) which collectively provide shape data regarding a shape of at least a portion of the elongate instrument. It should be appreciated that "shape sensor" as used herein may refer to any suitable localization sensor. Generally, a shape sensor as that term is used herein may provide any number of data points in any number of degrees of freedom including three or six degrees of freedom at a series of points monitored by the shape sensor along the length of the elongate instrument.

This registration at process 806 may rotate, translate, or otherwise manipulate by rigid or non-rigid transforms points associated with the model and points associated with data from a localization sensor disposed along a length of the elongate instrument 104. This registration between the model and instrument reference frames may be achieved, for example, by using any suitable registration algorithm such as a point-based iterative closest point (ICP) technique as described in U.S. Pat. App. Pub. Nos. 2018/0240237 and 2018/0235709, incorporated herein by reference in their entireties, or another point cloud registration technique. With the instrument reference frame 250 registered to the model reference frame 150, the imagery displayed to the operator on the display system may include a model of the elongate instrument generated from the elongate instrument shape data superimposed on the model of the patient anatomy. This information may illustrate a current location of the elongate instrument within the model to allow the operator to more accurately steer the elongate instrument, visualize a target relative to the elongate instrument, observe a virtual view from the perspective of a distal end of the elongate instrument, and/or improve efficiency and efficacy of targeted medical procedures.

Upon successful registration, a process 808 may include providing navigation guidance as the elongate instrument is navigated through the anatomic passageways to a predetermined deployment location in proximity to the target. Navigation may be performed manually by a user with navigation guidance provided, automatically by a control system, or via a combination of both. With reference again to FIG. 9, the elongate instrument 104 is shown positioned within lungs of a patient. As illustrated, the elongate instrument 104 may be navigated to a target site manually or automatically and then positioned for delivery of diagnostic or treatment tools in order to perform a medical procedure on the target 108. The elongate instrument 104 may carry an imaging device, such as an endoscopic device within a working channel of the elongate instrument 104, which provides live images during navigation to the target site to aid in navigating and positioning the device within anatomy. Additionally, navigational guidance may be provided to a user by a display system to aid delivery of the elongate instrument to the target 108. After the elongate instrument 104 has been positioned near and oriented toward target 108, the endoscopic device may be removed from the working channel of the elongate instrument to allow the working channel to be used for delivery of diagnostic or treatment tools. For example, the endoscopic device may be removed from the working channel such that a biopsy tool, imaging probe, or any other suitable instrument may be positioned within the working channel of the elongate instrument.

Because the elongate instrument 104 has been positioned within the anatomy based on the anatomic model 106 and navigational guidance provided based on registration between the model and the elongate instrument, if patient anatomy has shifted or the registration otherwise becomes inaccurate, the target may shift from an expected location. Thus, it can be beneficial to use internal imaging via an imaging probe to capture real time images of an anatomical target site and update the anatomic model 106 with the revised target location. It may also be beneficial to use internal imaging to add anatomical structures surrounding the target into the model so they can be avoided. In one example, ultrasound data may be captured by providing an ultrasound device coupled to or otherwise delivered by the elongate instrument. The ultrasound imaging data may be associated with an imaging reference frame correlating to the imaging device, e.g. ultrasound device. By registering the ultrasound device to the elongate instrument, the imaging reference frame can be correlated to the instrument reference which in turn is registered to the model reference frame as described above. Thus, image data such as ultrasound data may be used to update the model with a more accurate location of the target and/or additional anatomic features such as vasculature, anatomical boundaries, etc. Additionally, it can be beneficial to view a diagnostic or treatment tool within live imaging, such as an ultrasound imaging field, to verify accurate insertion of the diagnostic or treatment device within target tissue. It should be appreciated that any suitable imaging probe may be utilized without departing from the scope of this disclosure. An ultrasound probe is described as an example for the purposes of illustration only and should not be considered limiting.

Referring back to FIG. 8, at a process 810, intra-operative image data may be received from an imaging device, e.g., elongate instrument 104, a side-facing/side-firing or forward-facing imaging probe, or a sheath with an imaging device. For example, in an endobronchial application, an imaging probe, such as an endobronchial ultrasound (EBUS) probe or radial endobronchial ultrasound (REBUS) probe, may be inserted within a lumen of the elongate instrument. The imaging probe may be moveable relative to the elongate instrument in an insertion/retraction direction and may be rotatable relative to the elongate instrument while capturing ultrasound images. Additionally, a portion of the imaging probe, for example a portion extending from the distal end of the elongate instrument, may be bendable to capture ultrasound images through a range of motion as the imaging probe is bent.

Figure 10:
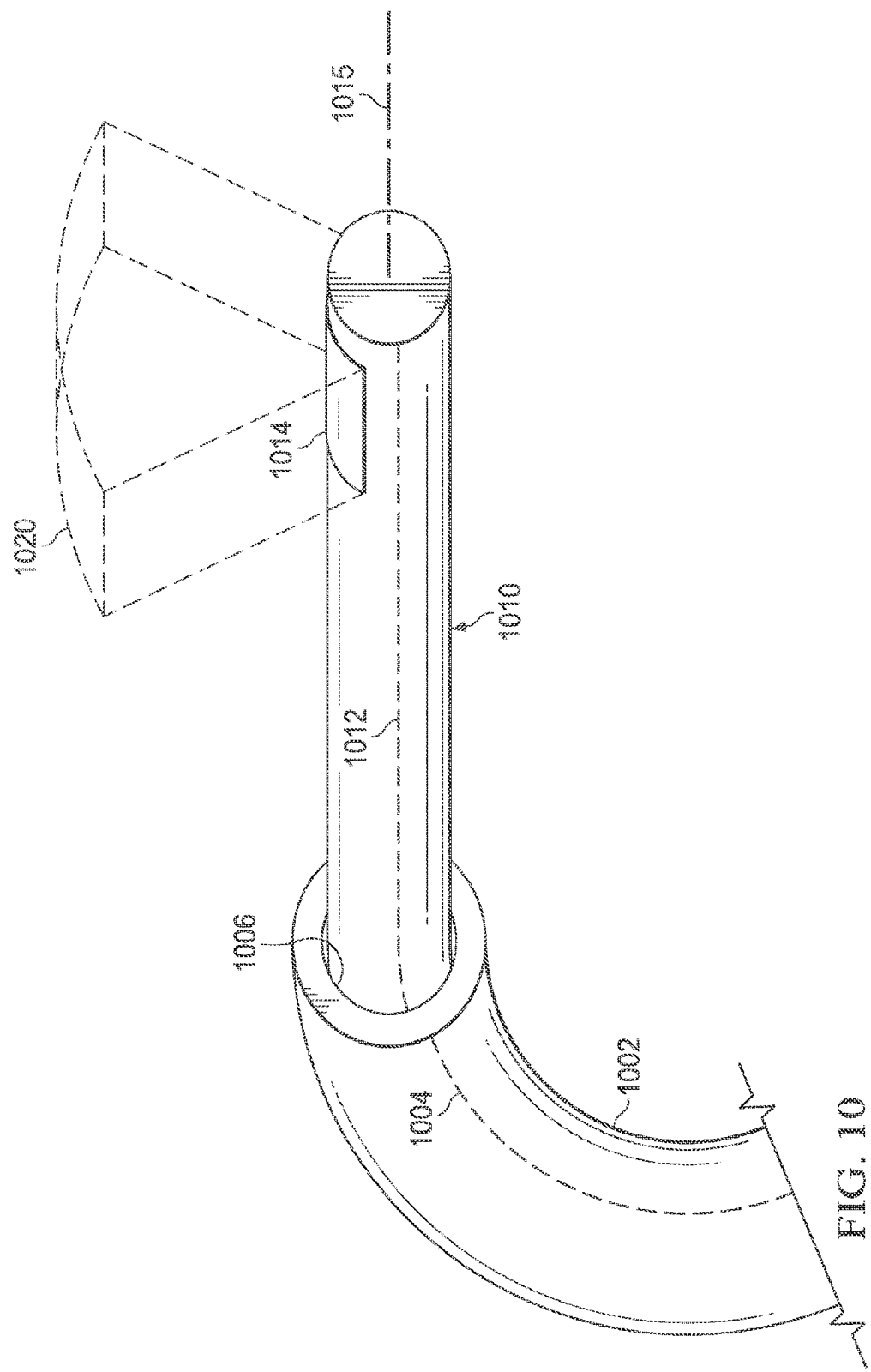
FIG. 10 illustrates an elongate instrument and a side-facing imaging device.

FIG. 10 illustrates an example of elongate instrument 1002 which may be applicable to the process 810 and includes an imaging probe 1010 extending from a working channel 1006 of the elongate instrument 1002. In this example, the imaging device is a side-facing/side-firing ultrasound array 1014 which may capture images in an imaging field 1020 extending laterally from a side of the probe 1010. As with previously described examples, the elongate instrument 1002 may comprise a sensor 1004 to provide localization data regarding at least a portion of the elongate instrument 1002. In the illustrated embodiment, the imaging probe 1010 may also comprise a localization sensor 1012 to provide localization data regarding a shape of at least a portion of the imaging probe 1010. In some examples, the relative position of the ultrasound array 1014 and the localization sensor 1012 are fixed and known, e.g., the ultrasound array 1014 is mounted to the imaging probe 1010 and the localization sensor 1012 is fixed at least at a distal tip of the localization sensor 1012, to the imaging probe 1010. In the illustrated example, the ultrasound array 1014 is offset 180 degrees from the localization sensor 1012 with respect to the longitudinal axis 1015. A side-facing/side-firing imaging probe, as illustrated in FIG. 10, may be moveably inserted within the working channel 1006 of the elongate instrument 1002 and also moveably rotated within the working channel 1006. That is, imaging probe 1010 may be configured to roll about a longitudinal axis 1015 such that the imaging field 1020 may be directed in any desired direction. In some examples, the imaging probe 1010 is rotated and positioned in a rotational position where the ultrasound array 1014 faces the anatomical target for capturing imaging data. In other examples, the imaging probe is rotated through a range, e.g., 360 degrees, capturing imaging data of a larger radial area surrounding the imaging probe 1010. A user may manually control such rolling or it may be automatically controlled by a control system.

The localization sensor 1012 may provide real-time position and orientation data along a point or multiple points of the imaging probe 1010 in an imaging probe reference frame. The image data, such as ultrasound data, captured by the ultrasound array 1014 is also spatially associated with the imaging probe reference frame. This imaging data may be used to update a model with a more accurate location of the target and/or additional anatomic features. In order to use the imaging data in this manner, the image reference frame associated with the imaging device should be registered to the instrument reference frame which, in turn, is registered to the model reference frame. Accordingly, at process 812, the localization data from the imaging probe localization sensor 1012 may be utilized with localization data from the elongate instrument sensor 1004 to register the imaging probe 1010 to the elongate instrument 1002 and, in turn, to a 3D model (e.g., anatomic model 106 of FIG. 9) as discussed in detail below.

FIGS. 11A-11E illustrate registration of first shape data from a first shape sensor of a first device (e.g., an elongate instrument) and second shape data from a second shape sensor of a second device (e.g., an imaging probe). The first shape data 1101 may comprise a plurality of points a-d in a reference frame of the first shape sensor and the second shape data 1102 may comprise a plurality of points e-i in a reference frame of the second shape sensor. It should be appreciated that shape data from a shape sensor may comprise any number of points, for example, hundreds or thousands of points may be included in shape data from a shape sensor. It should be further appreciated that the illustrated shape data may encompass the entire length of the respective shape sensors or may represent only a portion of the shape data along a portion of the length of the respective shape sensors. For example, the shape data 1101 may represent the shape of a distal portion of an elongate instrument and the shape data 1102 may represent the shape of a distal portion of an imaging probe. The illustrated embodiment is a simplified example for illustrative purposes. Additionally, each point may be associated with respective data such as relative three-dimensional position information or even six degree of freedom (6 DOF) data for each point (e.g., x-, y-, and z-position coordinates and orientations). Utilizing the two sets of points can also be utilized to calculate the degree or length of insertion of the imaging probe with respect to the elongate instrument.

The first shape data 1101 may be generated by a shape sensor of a first device having a working channel (e.g., elongate instrument 1002). The second shape data 1102 may be generated by a shape sensor of a corresponding second device disposed within such working channel (e.g., probe 1010). The first shape data and the second shape data may be captured simultaneously or at substantially the same time. In this regard, at least a portion of the first shape data 1101 will have a shape that is substantially similar to at least a portion of the second shape data 1102 due to the working channel of the first device constraining the second device to a similar shape.

Figure 11C:
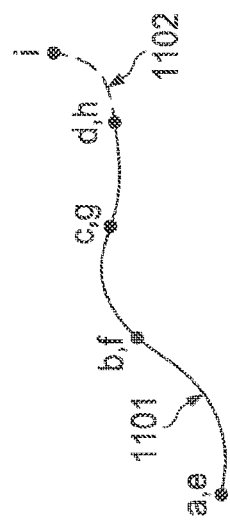
FIGS. 11A-11E illustrate registration of first shape data to second shape data.
Figure 11D:
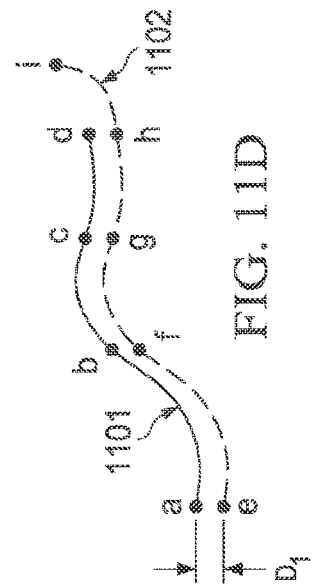
Figure 11E:
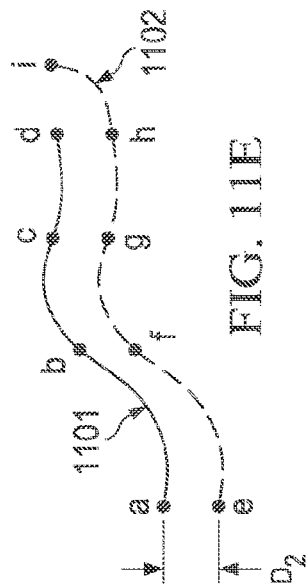
Figure 11A:
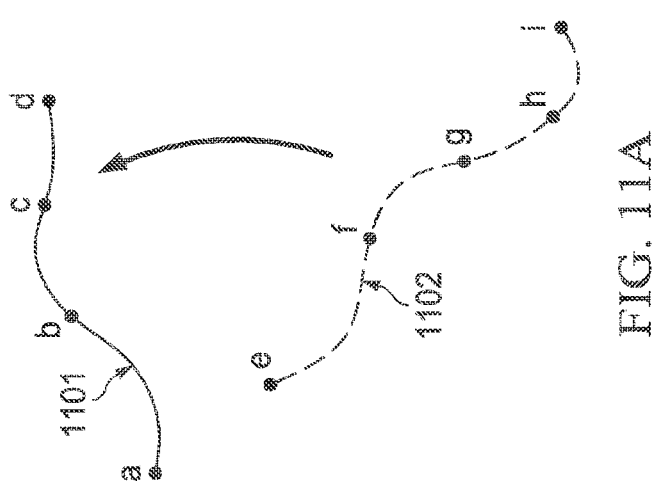

The first shape data 1101 and the second shape data 1102 may be generated in different reference frames such that their initial relative positions are not linked together, as shown in FIG. 11A. However, because at least a portion of the second device is disposed within and constrained by the working channel of the first device when the first and second shape data is generated, a portion of the first shape data 1101 must have a shape that is substantially similar to a portion of the second shape data 1102 and the respective shapes may be used to register the two data sets.

The second shape data 1102 may be registered to the first shape 1101 by identifying and aligning a shape of at least a portion of the first shape data 1101 and at least a portion of the second shape data 1102 with a corresponding shape. The first shape data and the second shape data may be registered to one another using any suitable registration algorithm, e.g., ICP or another point cloud registration technique and may rotate, translate, or otherwise manipulate by rigid or non-rigid transforms the points associated with the second shape data 1102 to the points associated with the first shape data 1101, or vice versa. Simplified examples of registration are discussed below.

In a first example of registration, a subset of the first shape data 1101 including a distal section of the first shape data may be used for registration with a subset of the second shape data 1102. In an endobronchial procedure, proximal sections of the first and second devices may be relatively straight in the patient's trachea. In contrast, distal sections of the devices are more likely to be curved having navigated deeper into the patient's airways with a more tortuous path.

In this regard, curves provided in the distal sections of the shape data may have more curvature which may provide a more accurate registration. Further, when an imaging probe is used to capture an intra-operative image that is to be registered to the model, it may be assumed that the imaging probe is extended from the elongate instrument when the image is captured. Accordingly, some portion of the shape of the imaging probe at the distal end of the probe may not assume a substantially similar shape of the instrument while a portion of the shape of the imaging probe, likely near but proximal to the distal end, will correspond to a shape of the distal portion of the elongate device. For the above reasons, the distal sections of the first shape data 1101 and second shape data 1102 may be selected for starting the registration procedure. In this regard, the registration process may begin by aligning subsets of the first and second shape data which include the distal-most points of the first and second shape data. In the illustrated example of FIG. 11A, this may include aligning a subset of the second shape data 1102 including distal-most point i with a subset of the first shape data 1101 including distal-most point d and rotating the second shape data 1102 until point h intersects the first shape data 1101.

However, because a portion of the imaging probe extends distally beyond the elongate instrument in the illustrated example, the shape of the imaging probe between points h and i is not constrained by the elongate instrument and therefore will have a shape that does not correspond to the first shape data. Accordingly, in order to improve the registration by excluding a portion of the imaging probe that is not constrained by the elongate instrument, the process may include sequentially selecting subsets of the first shape data and the second shape data and implementing a registration algorithm until an acceptable or optimal registration is identified. That is, because the distal most portion of the second shape data (e.g., between points h and i) may not be suitable for registration given that it is not confined to the shape of the first shape data, the process may include selecting a more proximal subset of the second shape data 1102 for registration with the distal most section of the first shape data 1101 to search for subsets of the shape data that provide an acceptable registration. In this regard, the process may include aligning a subset of the second shape data 1102 that includes the next proximal point of the second shape data (h) with a subset of the first shape data 1101 that includes the distal-most point of the first shape data (d). After the second shape data 1102 is rotated (e.g., such that point g intersects the first shape data at point c as shown in FIG. 11C), it may be determined that the registration is acceptable based on a satisfactory quality metric or error value.

Figure 11B:
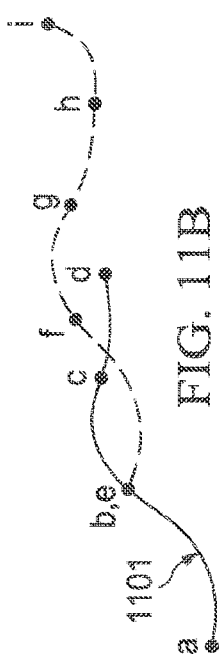

In another example of registration, the process may begin by roughly aligning all subsets of the second shape data with all subsets of the first shape data without regard for specific points and then shifting and/or rotating the second shape data until an acceptable match location and orientation is found. As shown in the example of FIG. 11B, the second shape data may be rotated from its orientation in FIG. 11A to the orientation shown in FIG. 11B. The second shape data 1102 may then be longitudinally translated along the first shape data 1101 until the shapes are aligned as shown in FIG. 11C. The second shape data 1102 may be rotated as necessary for alignment as it is translated with respect to the first shape data 1101. This process may be performed as part of an ICP registration technique in which the second shape data 1102 is iteratively translated closer and closer into alignment with the first shape data 1101 in manner to minimize a quality metric or error value.

It should also be appreciated that, rather than selecting specific sections or subsets of the first and second shape data to begin the registration, the entire point set of the second shape data 1102 may be compared to the entire point set of the first shape data 1101 using an ICP algorithm to determine which points in the second shape data correspond to points in the first shape data.

Upon successfully registering the first shape data 1101 and the second shape data 1102, the pairs of associated points will be substantially aligned as illustrated in FIG. 11C. As shown, the portion of the second shape data 1102 between points h and i extends beyond the aligned portions of the first shape data 1101 and the second shape data 1102 wherein the first shape data 1101 terminates and the second shape data 1102 continues. It may be assumed, therefore, that point d represents the distal end of the first device and a portion of the second device extending between point h and point i extends beyond the distal end of the first device. The length of this portion of the shape data may correspond to an insertion length of the second device (e.g., a distance by which the second device extends outside the first device from the working channel).

Shape sensor data may also be used to determine a roll angle of the second device with respect to the first device. For example, with reference back to FIG. 10, because the shape sensors may provide 6 DOF information for a number of points along a length of the elongate instrument 1002 and imaging probe 1010, a control system may determine the current roll angle of the imaging probe and the direction that the imaging device 1014 is facing. That is, because the shape sensor 1012 is rigidly attached in a known position on the imaging probe 1010, rolling the imaging probe will be reflected in the roll information provided by the 6 DOF measurement points generated by the shape sensor 1012.

Figure 13:
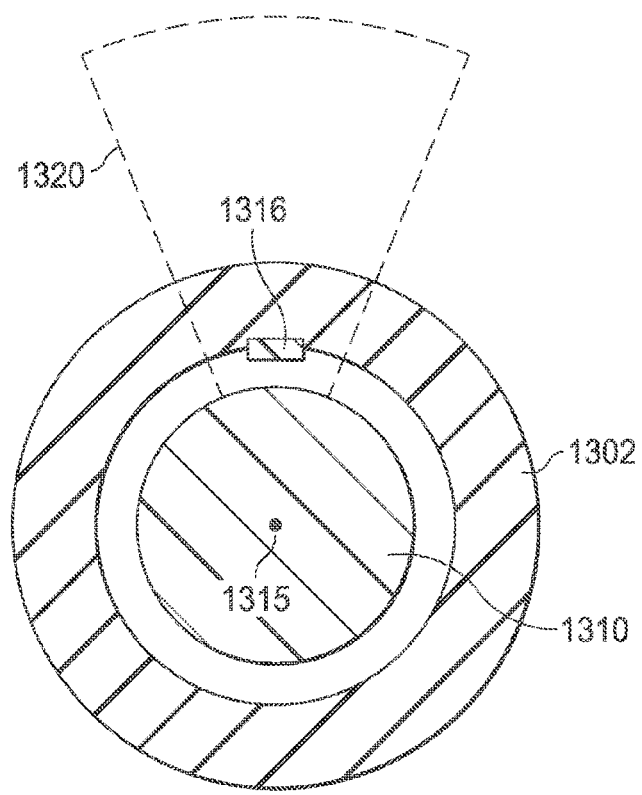
FIG. 13 illustrates a cross-section of an elongate instrument with an alignment indicator for an imaging probe.

In some examples, an elongate instrument may include an indicator that may be used to determine a roll angle of an imaging probe relative to the elongate instrument as shown in FIG. 13. For example, an indicator 1316 may be disposed on an internal surface of a working channel 1306 or embedded within a wall of the elongate instrument 1302. An indicator comprising a material that will appear distinct from the remainder of the elongate instrument 1302 in intra-operative imaging from the imaging probe 1310 may be disposed at a known radial position within the elongate instrument 1302. In this regard, an imaging device of the imaging probe 1310, such as an ultrasound array in an ultrasound probe, may be activated while the imaging device is within the working channel to view the indicator. By centering or otherwise establishing a relationship between the image data captured in the imaging field 1320 and the indicator 1316, it is possible to determine a current roll angle between the imaging probe 1310 and the elongate instrument 1302. Although illustrated in the context of the imaging probe 1310 and elongate instrument 1302 of FIG. 13, this principle may be similarly applied to any imaging probe and elongate instrument described herein.

Furthermore, first shape data 1101 and second shape data 1102 of FIG. 11C may be used to determine a current roll angle and further refine the registration. In this regard, it should be appreciated that directly aligning the first shape data 1101 and the second shape data 1102 as shown in FIG. 11C may provide a registration that is satisfactory for mapping imaging data to the model. However, a more accurate registration may be provided by accounting for a physical offset between the first shape sensor in the first device and the second shape sensor in the second device based on a current roll angle. That is, the first shape sensor and the second shape sensor are not physically co-located on top of one another but rather are spaced apart by some distance as discussed in relation to FIGS. 12A-12B below. The registration between the first and second shape data may account for this offset distance, which may change depending upon the roll angle.

Figure 12A:
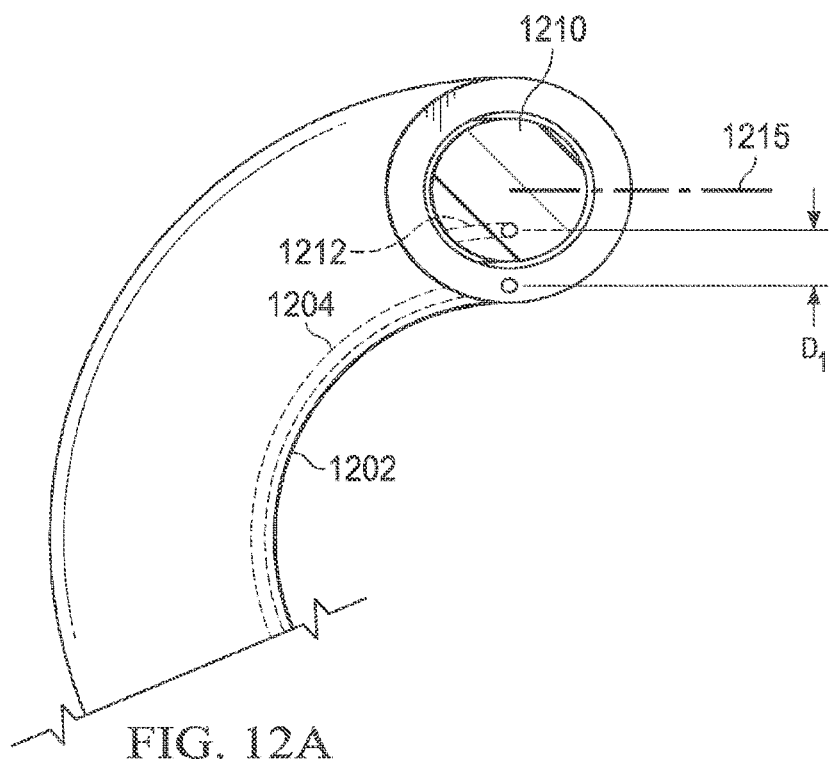
FIGS. 12A-12B illustrate an offset distance between a shape sensor of an imaging probe and a shape sensor of an elongate instrument.
Figure 12B:
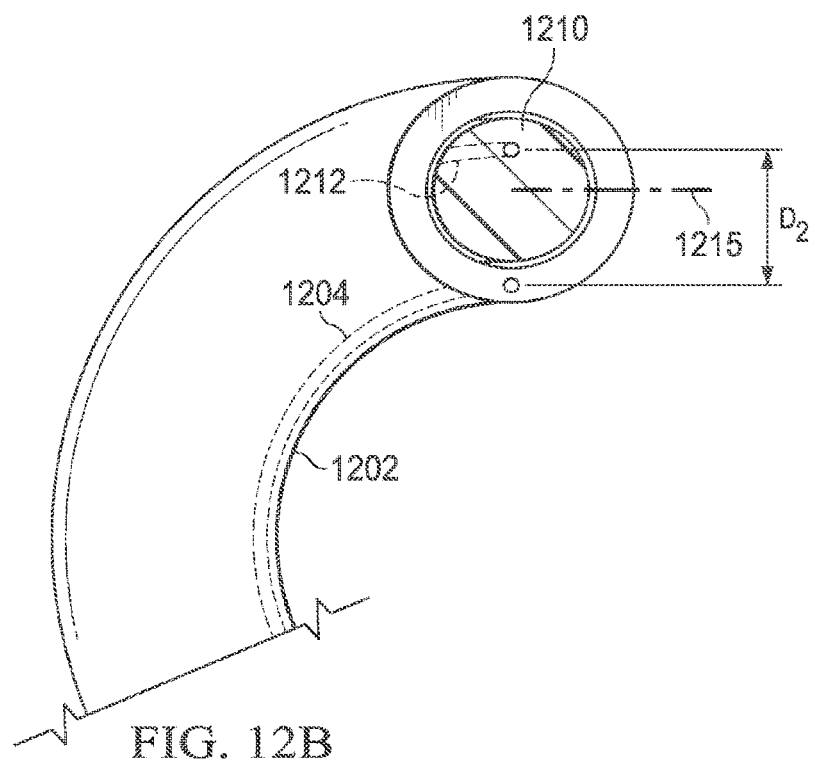

FIGS. 12A and 12B illustrate a relationship between the shape sensor of a first device (e.g., elongate instrument) and a shape sensor of a second device (e.g., an imaging probe). Specifically, a shape sensor 1212 may be disposed at a known location within the imaging probe 1210 offset from the longitudinal axis 1215 about which the imaging probe 1210 rolls within the working channel of the elongate instrument 1202. In this regard, when the imaging probe 1210 is at a first roll angle with respect to the elongate instrument 1202, the shape sensor 1212 may have a minimum offset distance Di with respect to the shape sensor 1204 of the elongate instrument 1202, as shown in FIG. 12A. When the imaging probe 1210 is rolled to a second roll angle with respect to the elongate instrument 1202, the second roll angle being 180 degrees from the first roll angle, the shape sensor 1212 may have a maximum offset distance $D_2$ with respect to the shape sensor 1204 of the elongate instrument 1202, as shown in FIG. 12B.

In this regard, when the roll angle of the imaging probe 1210 relative to the elongate instrument 1202 is unknown, first shape data from the shape sensor 1204 and second shape data from the shape sensor 1212 may be registered as described in relation to FIGS. 11A-11C above. Then, the imaging probe 1210 may be rolled within the elongate instrument 1202 and an offset distance between the first shape data and the second shape data may be monitored as it changes as shown in FIGS. 11D and 11E. In this regard, when the first shape data reaches a minimum offset distance or a maximum offset distance from the second shape data as shown in FIGS. 11D and 11E, it may be determined that the shape sensor 1204 is disposed at $D_1$ or $D_2$ respectively with regard to the shape sensor 1212 as shown in FIGS. 12A and 12B such that the roll angle may be determined.

Further in this regard, when the roll angle of the imaging probe 1210 relative to the elongate instrument 1202 is determined as described above or is known (e.g., using 6 DOF shape information, the indicator 1316 of FIG. 13, or the imaging probe is keyed to the elongate instrument to prevent roll), first shape data from the shape sensor 1204 and second shape data from the shape sensor 1212 may be registered as described in relation to FIGS. 11A-11C but with aligned points in the first shape data offset from the corresponding points of the second shape data with a distance and direction corresponding to a known, or determinable, offset between the shape sensor 1204 and the shape sensor 1212. In this regard, an error in the registration between the first shape data 1101 and second shape data 1102 may be reduced by aligned the first and second shape data with an offset that corresponds to the actual physical offset between the first and second shape sensors. For example, with reference to FIG. 12A, when the roll angle is known, a direction and distance of $D_1$ may be determined based on the known construction of the imaging probe 1210 and elongate instrument 1202 (e.g., offset distance and direction of the sensors with respect to axis of working channel) and the registration described with reference to FIGS. 11A-11C may account for offset $D_1$ between the first shape data and the second shape data as shown in FIG. 11D.

It will accordingly be appreciated that a first shape sensor and a second shape sensor will not be exactly co-located but rather will be offset by a distance which may be determined based on the known location of the first shape sensor within the first device, the known location of the second shape sensor within the second device, the known location of the working channel with the first device in which the second device is disposed, and/or an orientation (e.g., roll) of the second device with regard to the first device. In this regard, the registration may account for a known offset distance (e.g., $D_1$ or $D_2$ of FIGS. 11D-11E and 12A-12B) and/or direction between the first shape data and the second shape data. In this regard, during registration, the control system may align corresponding points of the first shape data 1101 and second shape data 1102 to be offset by a distance and direction corresponding to the current physical offset distance between the first shape sensor and the second shape sensor as shown in FIGS. 11D and 11E. This process may reduce a registration error as compared to registering the second shape data 1102 to be directly aligned or co-located with the first shape data 1101 because the first shape sensor is not directly co-located with second shape sensor in the physical construction of the respective elongate instrument and imaging probe.

Moreover, the known roll angle of the imaging probe relative to the elongate instrument at any given time may be used to track an orientation of imaging data relative to the elongate instrument. As a side-facing/side-firing imaging transducer is used to capture images through a range of rotation, the location of the captured images relative to the imaging probe is known based on the fixed location of the transducer on the imaging probe. By tracking the roll angle of the imaging probe relative to the elongate instrument as the imaging probe is rotated within the working channel, the orientation of the imaging data with respect to the elongate instrument may be determined which, in turn, allows for the imaging data to be registered to the model based on the registration of the elongate instrument to the model.

It is further contemplated that in some examples, the imaging probe 1210 may be rotationally fixed relative to the elongate instrument 1202, for example, by corresponding keying structures on each device. In such a configuration, roll of the imaging probe 1210 may be performed by manipulating the elongate instrument 1202 to direct the imaging field 1220 in a desired orientation.

With the imaging probe 1010 registered to the elongate instrument 1002, a control system may update the 3D model and provide navigational guidance for directing the imaging device 1014 at the target based on the updated model. For example, based on the registration between the shape sensor 1012 to the shape sensor 1004, the registration of the shape sensor 1004 to the model, and the roll angle, the control system may provide instructions (either to actuators or to a user) to manipulate the elongate instrument 1002 such that a distal end of the elongate instrument 1002 faces an expected location of the target as determined from the model. Additionally, because the location and roll angle of the imaging transducer 1014 are known relative to the elongate instrument 1002, the location of the imaging field 1020 and consequently anatomical structures (such as a target or vasculature identified in the imaging field 1020) may be mapped to the model despite the ability of the imaging probe 1010 to rotate about the roll axis.

It should be appreciated that registration between the first shape data and the second shape data can account for other mechanical and design aspects of an imaging device, an imaging localization sensor, an imaging probe, and/or an elongate instrument. For example, the previously described methods of registration assume the imaging device is fixed to the imaging probe such that the position and orientation of the imaging device with respect to the imaging localization sensor (e.g., shape sensor) are known. In that regard, the registration of the captured images to the model can be performed by comparing the shape of the imaging localization sensor with the shape of the elongate instrument localization sensor to determine the positioning and orientation of the imaging probe (including the imaging device) relative to the elongate instrument.

In an additional example of registering intra-operative images to a model, the shape of the imaging localization sensor in the imaging probe may be compared with the shape of the anatomic model. By identifying the portion of the anatomic model having a shape matching the shape of the imaging localization sensor, the imaging frame of reference for the imaging device may be registered to the model frame of reference directly.

In another example, the registration of the elongate instrument to the model may be based on image data from an optical imaging device such as an endoscopic camera associated with the elongate instrument. For example, an anatomical landmark may be visible in the image data and mapped to a corresponding landmark location in the model.

In other examples, features in an intra-operative image (e.g., ultrasound image) can be segmented and compared with the model utilizing an automatic imaging process or a semi-manual process where the user associates a particular rotation with particular knowledge of the anatomy. Additional sensors could also be used to monitor additional degrees of freedom such as rotation of an imaging device using additional strain or twist sensors to understand the degree of twist of the imaging probe compared to the baseline state.

It is contemplated that the principles described in relation to FIGS. 10-13 may similarly apply to the other illustrated examples such as those of FIGS. 5-7. For example, sensor 504, 604, 704 provides elongate instrument shape data regarding a shape of at least a portion of the elongate instrument 502, 602, 702 respectively and the shape sensor 512, 612, 712 provides shape data regarding a shape of at least a portion of the imaging probe 510, 610 or sheath 710. Similar to the processes described with reference to FIGS. 10-13, the shape data from the shape sensors 504, 604, 704 and 512, 612, 712 may be used to register an imaging probe to an elongate instrument (or a sheath to an elongate instrument) and, in turn, to a 3D model (e.g., anatomic model 106 of FIG. 9). With the reference frame of the imaging device registered to the model reference frame 150, the imagery displayed to the operator on the display system may include a rendered image of the elongate instrument and/or the imaging probe or sheath generated from the imaging probe or sheath shape data superimposed on the model of the patient anatomy. Further, anatomical structures such as a target or vasculature identified in the imaging field may be mapped to the model as will be described in more detail below. The real time position of the rendered image of the elongate instrument and/or imaging probe or sheath, can be updated to aid the user in positioning the elongate instrument and/or imaging probe or sheath in delivery of the tool to the target. While in the embodiments of FIGS. 5-7 an actual image of the tool as it is being delivered to the target can be provided, it can still be beneficial to view the updated model showing additional anatomy and the relative positions of the instrument, probe or sheath to the target and anatomical structures and receive navigational guidance during delivery of the tool.

It is further contemplated that any of the elongate instruments 104, 502, 602, 702, 1002, 1202, 1302 described herein may each be controllable either manually or automatically by a control system or may be passive such that they are compliant to forces exerted against them. Similarly, it is contemplated that probes 510, 610, 1010, 1210, 1310 and sheath 710 may each be controllable either manually or automatically be a control system or may be passive such that they are compliant to forces exerted against them. For example, the elongate instrument 1002 of FIG. 10 may be controllable via steering by a manipulator assembly and or instrument system (as described below in relation to FIG. 15) while the imaging probe 1010 may be passive. Alternatively, both the elongate instrument 1002 and the imaging probe 1010 may be controllable. As an additional alternative, the elongate instrument 1002 may be passive and steering of the elongate instrument 1002 may be performed by a controllable imaging probe 1010. A similar arrangement may be applicable to the sheath 710 of FIG. 7 which may be passively steerable by manipulation of the elongate instrument 702.

Referring back to FIG. 8, at a process 814, the target may be identified in the intra-operative image data from the ultrasound probe either manually or automatically by a control system. In some embodiments, identifying the target may include receiving an indication or selection from a user at a user interface. For example, a user may manually select portions of the image data to be associated with the target. Manual identification of the target may be necessary when automatic identification of the target has produced unsatisfactory results and a user is instructed to manually identify the target in the image data. After identifying the target in the intra-operative image data from the ultrasound probe, the location of the target may be determined in the ultrasound reference frame.

At a process 816, the intra-operative image data may be mapped from the intra-operative image reference frame, or ultrasound reference frame, to the model reference frame. This procedure may be enabled by a known location of the ultrasound array on the ultrasound probe relative to the shape sensor of the ultrasound probe, the ultrasound probe being registered to the elongate instrument using the first shape data and the second shape data (e.g., by process 812), and the elongate instrument being registered to the model (e.g., by process 806) as previously described. In this regard, the location of the target relative to the ultrasound probe may be determined using the intra-operative image data which may, in turn, be used to update the location of the target in the model at a process 818. For example, the target location in the model may be adjusted to a position and orientation with respect to a current location of the modeled ultrasound probe in the model as determined from the intra-operative image data indicating the position and orientation of the actual target from the actual ultrasound probe.

Figure 14C:
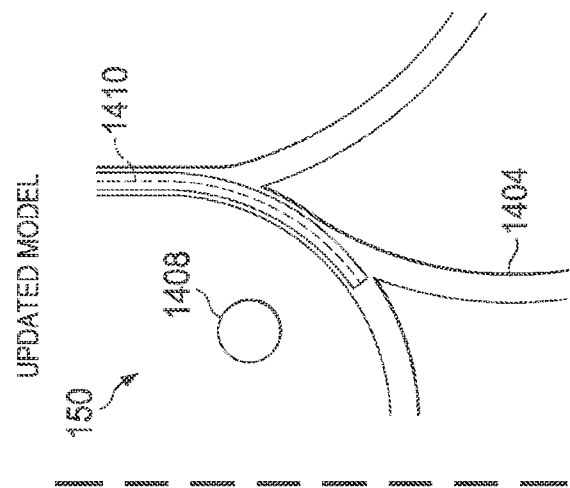
FIGS. 14A-14C illustrates a simplified diagram of updating a target location in an anatomic model using image data and shape data from an instrument.
Figure 14B:
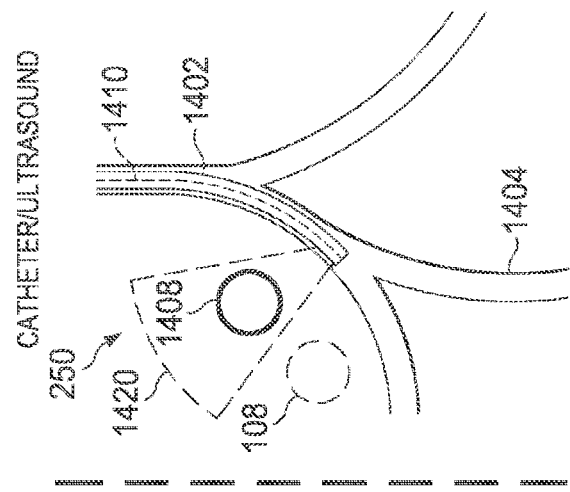
Figure 14A:
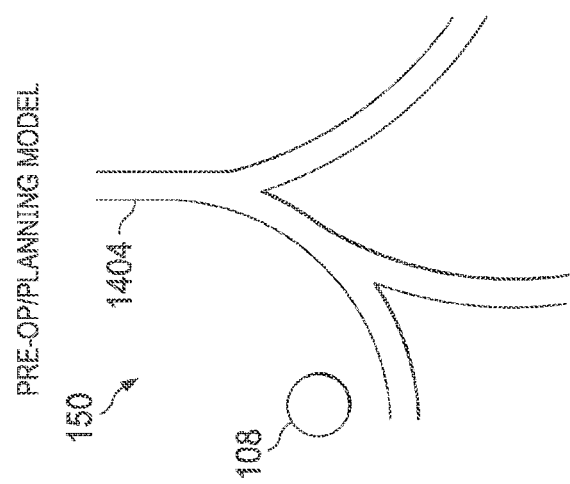

FIGS. 14A-14C illustrate simplified diagrams of updating a target location in an anatomic model using image data and shape data from an instrument as discussed above in relation to method 800. Initially as shown in FIG. 14A, a 3D planning model may be constructed from pre-operative or intra-operative image data. The model may include anatomical passageways 1404 and a pre-operative location of a target 108 disposed relative to anatomical passageways 1404 in a model reference frame 150.

As shown in FIG. 14B, during a medical procedure, an instrument 1402 including a shape sensor 1410 and an imaging device with an imaging field 1420 in an elongate instrument/ultrasound reference frame 250 may be inserted into a patient's anatomical passageways 1404. It should be appreciated that instrument 1402 may include any of the examples described in FIGS. 1-7 and 10, for example: an elongate instrument such as 104, an elongate instrument and imaging probe such as 502/510, 602/610, 1002/1010, or a sheath 710. In this regard, the imaging field 1420 may be generated by elongate instrument 104, imaging probe 510, 610, or 1010, or the sheath 710. Further in this regard, the shape sensor 1410 may correspond to shape sensor(s) 204, 304, 504/512, 604/612, 704/712, or 1004/1012, depending on which example embodiment is utilized.

The actual location of the target 1408 may be identified by the instrument 1402 which is registered to the model as described in relation to process 806 above. The location of the target 1408 may be determined relative to the instrument 1402 based on the intra-operative imaging, which in turn, may be determined relative to the model.

In this regard, an updated model, as shown in FIG. 14C, may include a revised target location in the model reference frame 150 corresponding to the location of the target 1408.

It should be appreciated that the procedure described in relation to FIGS. 14A-C may be utilized for adding vasculature or other anatomical structures to the model. That is, the imaging field of the instrument 1402 may include vasculature or other anatomical structures which may be added to the model or may have an updated location in the model by determining a location of such anatomical structures with regard to the instrument 1402 based on their location in the imaging field 1420. In turn, the location of the anatomical structures may be mapped for addition to or revising a location in the model.

For example, turning back to FIG. 8, at a process 822 one or more anatomical structures of the patient tissue may be identified in the intra-operative image data by a control system. For example, vasculature of the patient, which an operator may which to avoid with interventional tools, may be identified from the intra-operative image data generated by the ultrasound probe. In some embodiments, Doppler ultrasound techniques may be used to detect the vasculature. In some embodiments, identifying the vasculature or other anatomical structures may be completed automatically, for example the vasculature may be segmented out of the intra-operative data. In other embodiments, identifying the vasculature or other anatomical structures may additionally or alternatively include receiving an indication or selection from a user at a user interface. For example, a user may manually select portions of the image data on the display system to associate with the anatomical structures. Manual identification of the anatomical structures may be necessary when automatic identification of the anatomical structures has produced unsatisfactory results and a user is instructed to manually identify the anatomical structures in the image data.

At a process 824, the intra-operative image data may be mapped from the intra-operative image reference frame, or ultrasound reference frame, to the model reference frame. This procedure may be enabled by a known location of the ultrasound array on the ultrasound probe relative to the shape sensor of the ultrasound probe, the ultrasound probe being registered to the elongate instrument using the first shape data and the second shape data (e.g., by process 812), and the elongate instrument being registered to the model (e.g., by process 806). In this regard, the location of the vasculature or other anatomical structures relative to the ultrasound probe may be determined using the intra-operative image data which may, in turn, be used to update the model with the vasculature or other anatomical structures at a process 826. In some examples, the pre-operative or intra-operative imaging from which the model is initially generated may not capture vasculature or other anatomical structures such that updating the model at process 826 may comprise adding the identified vasculature or other anatomical structures to the model. In some examples, the pre-operative or intra-operative imaging from which the model is initially generated may capture vasculature or other anatomical structures, and updating the model at process 826 may comprise revising a location of the vasculature or other anatomical structures in the model, as may be the case when the pre-operative or intra-operative imaging does not provide a sufficiently accurate location of the vasculature or other anatomical structures or when the vasculature or other anatomical structures have moved relative to other tissue subsequent to capturing the pre-operative or intra-operative imaging.

It should be appreciated that the method 800 may include or omit one or both of processes 814-818 and processes 822-826. In other words, in some examples, processes 814-818 may be omitted such as when the target location is sufficiently accurate in the model as determined from the pre-operative or intra-operative imaging upon which the model is based. In some examples, processes 822-826 may be omitted such as when the region of tissue in which the target is disposed is free of vasculature or other anatomical structures which need to be avoided by interventional tools. However, it will be appreciated that identifying and avoiding vasculature may be particularly important in certain regions of the anatomy, such as in the mediastinum.

Subsequent to process 818 and/or process 826, the method 800 may optionally include process 820 for updating the path or route through the patient anatomy that was previously determined at process 804 and displaying the revised path to a user. For example, upon analyzing the intra-operative image data from the ultrasound probe, it may be determined that a distance between the original location of the target in the model and the revised or updated location of the target in the model (as determined at process 818) is sufficiently large that a revised navigation path is needed to navigate the elongate instrument to the target. Such a determination may include a predefined or user selected threshold distance which may be compared to a measured distance between the original location of the target in the model and the revised or updated location of the target in the model to determine whether an updated path in some examples, including an updated parked position of the elongate instrument, delivery imaging probe, or delivery sheath for accurate delivery of the tool to the target is needed.

Similarly, upon analyzing the intra-operative image data from the ultrasound probe, it may be determined that vasculature or other anatomical structures in the model (as determined at process 826) which the operator desires to avoid necessitate a new route to the target at process 820. For example, the route determined at process 804 may pass through or within a threshold distance of vasculature or other anatomical structures that have been added to the model or have had their location revised in the model at process 826. In this regard, process 820 may comprise updating the path, parking position, or route in a manner which safely avoids the vasculature or other anatomical structures.

In some instances, such as when a target is confirmed to be at its expected location and there is no vasculature identified which must be avoided, the route determined in process 804 may be confirmed rather than revised at process 820.

Although described in the context of a probe in an elongate instrument providing ultrasound images (related to the examples of FIGS. 5, 6, and 10), it should be appreciated that the processes of the method 800 may be applied to other combinations of medical devices which are considered to be within the scope of this disclosure. In some examples, probes using other imaging modalities than ultrasound may be used for capturing the intra-operative image data such as optical imaging, laser imaging, etc. In some examples, the probe described in relation to method 800 may comprise a sheath disposed around the elongate instrument (related to the example of FIG. 7).

In some embodiments, the registration techniques of this disclosure, such as those discussed in relation to FIGS. 8 and 11A-11E, may be used in an image-guided medical procedure performed with an elongate instrument, an imaging probe, and/or a sheath which may be hand-held or otherwise manually controlled. In other embodiments, these registration techniques may be used in an image-guided medical procedure performed with a robot-assisted medical system as shown in FIGS. 15-16. FIG. 15 illustrates a clinical system 10 that includes a robot-assisted medical system 1500. The robot-assisted medical system 1500 generally includes a manipulator assembly 1502 for operating a medical instrument system 1504 (including, for example, elongate instruments 104, 502, 602, 702, 1002, probes 510, 610, 1010, and/or sheath 710) in performing various procedures on a patient P positioned on a table T in a surgical environment 1501. The manipulator assembly 1502 may be robot-assisted, non-assisted, or a hybrid robot-assisted and non-assisted assembly with select degrees of freedom of motion that may be motorized and/or robot-assisted and select degrees of freedom of motion that may be non-motorized and/or non-assisted. A master assembly 1506, which may be inside or outside of the surgical environment 1501, generally includes one or more control devices for controlling manipulator assembly 1502. Manipulator assembly 1502 supports medical instrument system 1504 and may optionally include a plurality of actuators or motors that drive inputs on medical instrument system 1504 in response to commands from a control system 1512. The actuators may optionally include drive systems that when coupled to medical instrument system 1504 may advance medical instrument system 1504 into a naturally or surgically created anatomic orifice. Other drive systems may move the distal end of medical instrument system 1504 in multiple degrees of freedom, which may include three degrees of linear motion (e.g., linear motion along the X, Y, Z Cartesian axes) and in three degrees of rotational motion (e.g., rotation about the X, Y, Z Cartesian axes). Additionally, the actuators can be used to actuate an articulable end effector of medical instrument system 1504 for grasping tissue in the jaws of a biopsy device and/or the like.

Robot-assisted medical system 1500 also includes a display system 1510 (which may the same as display system 100) for displaying an image or representation of the surgical site and medical instrument system 1504 generated by a sensor system 1508 and/or an endoscopic imaging system 1509. Display system 1510 and master assembly 1506 may be oriented so operator O can control medical instrument system 1504 and master assembly 1506 with the perception of telepresence.

In some embodiments, medical instrument system 1504 may include components for use in surgery, biopsy, ablation, illumination, irrigation, or suction. Optionally medical instrument system 1504, together with sensor system 1508 may be used to gather (i.e., measure) a set of data points corresponding to locations within anatomic passageways of a patient, such as patient P. In some embodiments, medical instrument system 1504 may include components of the endoscopic imaging system 1509, which may include an imaging scope assembly or imaging instrument that records a concurrent or real-time image of a surgical site and provides the image to the operator or operator O through the display system 1510. The concurrent image may be, for example, a two or three-dimensional image captured by an imaging instrument positioned within the surgical site. In some embodiments, the endoscopic imaging system components may be integrally or removably coupled to medical instrument system 1504. However, in some embodiments, a separate endoscope, attached to a separate manipulator assembly may be used with medical instrument system 1504 to image the surgical site. The endoscopic imaging system 1509 may be implemented as hardware, firmware, software, or a combination thereof which interact with or are otherwise executed by one or more computer processors, which may include the processors of the control system 1512.

The sensor system 1508 may include a position/location sensor system (e.g., an electromagnetic (EM) sensor system) and/or a shape sensor system for determining the position, orientation, speed, velocity, pose, and/or shape of the medical instrument system 1504.

Robot-assisted medical system 1500 may also include control system 1512. Control system 1512 includes at least one memory 1516 and at least one computer processor 1514 for effecting control between medical instrument system 1504, master assembly 1506, sensor system 1508, endoscopic imaging system 1509, intra-operative imaging system 1518, and display system 1510. Control system 1512 also includes programmed instructions (e.g., a non-transitory machine-readable medium storing the instructions) to implement some or all of the methods described in accordance with aspects disclosed herein, including instructions for providing information to display system 1510.

Control system 1512 may optionally further include a virtual visualization system to provide navigation assistance to operator O when controlling medical instrument system 1504 during an image-guided surgical procedure. Virtual navigation using the virtual visualization system may be based upon reference to an acquired pre-operative or intra-operative dataset of anatomic passageways. The virtual visualization system processes images of the surgical site imaged using imaging technology such as computerized tomography (CT), magnetic resonance imaging (MRI), fluoroscopy, thermography, ultrasound, optical coherence tomography (OCT), thermal imaging, impedance imaging, laser imaging, nanotube X-ray imaging, and/or the like.

An intra-operative imaging system 1518 may be arranged in the surgical environment 1501 near the patient P to obtain images of the anatomy of the patient P during a medical procedure. The intra-operative imaging system 1518 may provide real-time or near real-time images of the patient P. In some embodiments, the intra-operative imaging system 1518 may comprise an ultrasound imaging system for generating two-dimensional and/or three-dimensional images. For example, the intra-operative imaging system 1518 may be at least partially incorporated into an ultrasound probe such as probe 510, 610, 1010, an ultrasound sheath such as sheath 710, or an elongate instrument such as elongate instrument 104. In this regard, the intra-operative imaging system 1518 may be partially or fully incorporated into the medical instrument system 1504.

FIG. 16 illustrates a surgical environment 1600 with an instrument reference frame ($X_I$, $Y_I$, $Z_I$) 250 in which the patient P is positioned on the table T. Patient P may be stationary within the surgical environment in the sense that gross patient movement is limited by sedation, restraint, and/or other means. Cyclic anatomic motion including respiration and cardiac motion of patient P may continue unless the patient is asked to hold his or her breath to temporarily suspend respiratory motion. Within surgical environment 1600, an elongate instrument 1614 (e.g., a portion of the medical instrument system 1504) is coupled to an instrument carriage 1606. In this embodiment, elongate instrument 1614 includes an elongate instrument 1602 coupled to an instrument body 1612. Instrument carriage 1606 is mounted to an insertion stage 1608 fixed within surgical environment 1600. Alternatively, insertion stage 1608 may be movable but have a known location (e.g., via a tracking sensor or other tracking device) within surgical environment 1600. In these alternatives, the instrument reference frame 250 is fixed or otherwise known relative to the surgical reference frame. Instrument carriage 1606 may be a component of a robot-assisted manipulator assembly (e.g., robot-assisted manipulator assembly 1502) that couples to elongate instrument 1614 to control insertion motion (i.e., motion along an axis A) and, optionally, motion of a distal end 1618 of the elongate instrument 1602 in multiple directions including yaw, pitch, and roll. Instrument carriage 1606 or insertion stage 1608 may include actuators, such as servomotors, (not shown) that control motion of instrument carriage 1606 along insertion stage 1608.

As shown in FIG. 16, instrument body 1612 is coupled and fixed relative to instrument carriage 1606. In some embodiments, the optical fiber shape sensor 1604 is fixed at a proximal point 1616 on instrument body 1612. In some embodiments, proximal point 1616 of optical fiber shape sensor 1604 may be movable along with instrument body 1612 but the location of proximal point 1616 may be known (e.g., via a tracking sensor or other tracking device). Shape sensor 1604 measures a shape from proximal point 1616 to another point such as distal end 1618 of elongate instrument 1602 in the instrument reference frame ($X_I$, $Y_I$, $Z_I$) 250.

Elongate instrument 1602 includes a channel (not shown) sized and shaped to receive a medical instrument 1610. In some embodiments, medical instrument 1610 may be used for procedures such as surgery, biopsy, ablation, illumination, irrigation, or suction. Medical instrument 1610 can be deployed through elongate instrument 1602 and used at a target location within the anatomy. Medical instrument 1610 may include, for example, image capture probes, biopsy instruments, laser ablation fibers, and/or other surgical, diagnostic, or therapeutic tools. Medical instrument 1610 may be advanced from the distal end 1618 of the elongate instrument 1602 to perform the procedure and then retracted back into the channel when the procedure is complete. Medical instrument 1610 may be removed from proximal end of elongate instrument 1602 or from another optional instrument port (not shown) along elongate instrument 1602.

Elongate instrument 1602 may also house cables, linkages, or other steering controls (not shown) to controllably bend distal end 1618. In some examples, at least four cables are used to provide independent "up-down" steering to control a pitch of distal end 1618 and "left-right" steering to control a yaw of distal end 1618.

A position measuring device 1620 provides information about the position of instrument body 1612 as it moves on insertion stage 1608 along an insertion axis A. Position measuring device 1620 may include resolvers, encoders, potentiometers, and/or other sensors that determine the rotation and/or orientation of the actuators controlling the motion of instrument carriage 1606 and consequently the motion of instrument body 1612. In some embodiments, insertion stage 1608 is linear, while in other embodiments, the insertion stage 1608 may be curved or have a combination of curved and linear sections.

In the description, specific details have been set forth describing some embodiments. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

Elements described in detail with reference to one embodiment, implementation, or application optionally may be included, whenever practical, in other embodiments, implementations, or applications in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, implementation, or application may be incorporated into other embodiments, implementations, or aspects unless specifically described otherwise, unless the one or more elements would make an embodiment or implementation non-functional, or unless two or more of the elements provide conflicting functions.

Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. In addition, dimensions provided herein are for specific examples and it is contemplated that different sizes, dimensions, and/or ratios may be utilized to implement the concepts of the present disclosure. To avoid needless descriptive repetition, one or more components or actions described in accordance with one illustrative embodiment can be used or omitted as applicable from other illustrative embodiments. For the sake of brevity, the numerous iterations of these combinations will not be described separately. For simplicity, in some instances the same reference numbers are used throughout the drawings to refer to the same or like parts.

While some embodiments are provided herein with respect to medical procedures, any reference to medical or surgical instruments and medical or surgical methods is non-limiting. For example, the instruments, systems, and methods described herein may be used for non-medical purposes including industrial uses, general robotic uses, and sensing or manipulating non-tissue work pieces. Other example applications involve cosmetic improvements, imaging of human or animal anatomy, gathering data from human or animal anatomy, and training medical or nonmedical personnel. Additional example applications include use for procedures on tissue removed from human or animal anatomies (without return to a human or animal anatomy) and performing procedures on human or animal cadavers. Further, these techniques can also be used for surgical and nonsurgical medical treatment or diagnosis procedures.

The methods described herein are illustrated as a set of operations or processes. Not all the illustrated processes may be performed in all embodiments of the methods. Additionally, one or more processes that are not expressly illustrated or described may be included before, after, in between, or as part of the example processes. In some embodiments, one or more of the processes may be performed by the control system (e.g., control system 1112) or may be implemented, at least in part, in the form of executable code stored on non-transitory, tangible, machine-readable media that when run by one or more processors (e.g., the processors 1114 of control system 1112) may cause the one or more processors to perform one or more of the processes.

Devices which are described as controllable may be referred to as a "steerable elongate flexible device" herein. For example, each of the disclosed elongate instruments, imaging probes, or sheaths may be a steerable elongate flexible device. Furthermore, any described "imaging device" may include an ultrasound array, optical imaging device, or any other suitable imaging hardware. Any described "imaging probe" may include an ultrasound probe, an optical imaging probe, or a probe incorporating any other suitable imaging modality and any described "ultrasound probe" may be substituted for any other type of imaging probe. Any described "flexible instrument" may include an imaging probe, diagnostic tool, treatment device, etc. Additionally, any "ultrasound array," "imaging array," or "imaging device" as described herein may comprise a single imaging component (e.g., transducer) or a plurality of such devices.

One or more elements in embodiments of this disclosure may be implemented in software to execute on a processor of a computer system such as control processing system. When implemented in software, the elements of the embodiments of the invention are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In one embodiment, the control system supports wireless communication protocols such as Bluetooth, IrDA, HomeRF, IEEE 802.11, DECT, and Wireless Telemetry.

Note that the processes and displays presented may not inherently be related to any particular computer or other apparatus. Various general-purpose systems may be used with programs in accordance with the teachings herein, or it may prove convenient to construct a more specialized apparatus to perform the operations described. The required structure for a variety of these systems will appear as elements in the claims. In addition, the embodiments of the invention are not described with reference to any particular programming language. It will be appreciated that a variety of programming languages may be used to implement the teachings of the invention as described herein.

In some instances well known methods, procedures, components, and circuits have not been described in detail so as not to unnecessarily obscure aspects of the embodiments. This disclosure describes various instruments, portions of instruments, and anatomic structures in terms of their state in three-dimensional space. As used herein, the term "position" refers to the location of an object or a portion of an object in a three-dimensional space (e.g., three degrees of translational freedom along Cartesian x-, y-, and z-coordinates). As used herein, the term "orientation" refers to the rotational placement of an object or a portion of an object (three degrees of rotational freedom—e.g., roll, pitch, and yaw). As used herein, the term "pose" refers to the position of an object or a portion of an object in at least one degree of translational freedom and to the orientation of that object or portion of the object in at least one degree of rotational freedom (up to six total degrees of freedom). As used herein, the term "shape" refers to a set of poses, positions, or orientations measured along an object.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. A system comprising:
    an elongate flexible device comprising a first shape sensor configured to generate first shape data corresponding to a shape of the elongate flexible device;
    a flexible instrument comprising a second shape sensor configured to generate second shape data corresponding to a shape of the flexible instrument while the flexible instrument is mated with the elongate flexible device along a length of the flexible instrument constrained by a length of the elongate flexible device, the second shape data being generated in a reference frame different than a reference frame of the first shape data; and
    a processor configured to:
        register the flexible instrument to the elongate flexible device by aligning at least a portion of the first shape data associated with the length of the elongate flexible device with at least a portion of the second shape data associated with the length of the flexible instrument and having a shape that corresponds to the portion of the first shape data.

2. The system of claim 1, wherein the first shape data and the second shape data each include a plurality of points providing information regarding at least five degrees of freedom at each respective point.

3. The system of claim 2, wherein the processor is further configured to determine a roll of angle of the flexible instrument relative to the elongate flexible device based on the first shape data and the second shape data.

4. The system of claim 1, wherein the processor is further configured to:
   identify a length of a portion of the second shape data or the first shape data having a non-corresponding shape to the other of the first shape data or the second shape data.

5. The system of claim 1, wherein the flexible instrument comprises an ultrasound probe.

6. The system of claim 5, wherein the ultrasound probe comprises a forward-facing transducer, a forward-facing ring array, or a side-facing transducer.

7. The system of claim 1, wherein the elongate flexible device further comprises a working channel configured to receive an instrument.

8. The system of claim 7, wherein the instrument comprises the flexible instrument.

9. The system of claim 1, wherein the flexible instrument comprises a working lumen configured to receive an instrument.

10. The system of claim 7, wherein the instrument comprises an imaging probe, biopsy needle, a treatment device, or the elongate flexible device.

11. The system of claim 9, wherein the working lumen is aligned to direct the instrument into an imaging field of the flexible instrument.

12. The system of claim 7, wherein the elongate flexible device further comprises a rapid-exchange side port configured to receive an instrument.

13. The system of claim 8, wherein an internal surface of the working channel comprises at least one indicator for determining roll angle of the flexible instrument relative to the elongate flexible device.

14. The system of claim 1, wherein the processor is further configured to:
   register the elongate flexible device to an anatomical model of a patient anatomy, wherein the anatomical model includes a target; and
   plan a path to the target.

15. The system of claim 14, wherein the processor is further configured to:
   update a location of the target in the anatomical model based on data from the flexible instrument.

16. The system of claim 15, wherein the processor is further configured to:
   revise the path based on the updated location of the target.

17. The system of claim 14, wherein the processor is further configured to:
   identify vasculature in the patient anatomy from Doppler ultrasound data collected by the flexible instrument.

18. The system of claim 17, wherein the processor is further configured to:
   update the anatomical model to include the vasculature.

19. The system of claim 18, wherein the processor is further configured to:
   revise the path based on the updated anatomical model to avoid a portion of the vasculature.

20. A method comprising:
   generating first shape data with a first shape sensor of an elongate flexible device, the first shape data corresponding to a shape of the elongate flexible device;
   generating second shape data with a second shape sensor of a flexible instrument while the flexible instrument is mated with the elongate flexible device along a length of the flexible instrument constrained by a length of the elongate flexible device, the second shape data corresponding to a shape of the flexible instrument, the second shape data being generated in a reference frame different than a reference frame of the first shape data; and
   registering the flexible instrument to the elongate flexible device by aligning at least a portion of the first shape data associated with the length of the elongate flexible device with at least a portion of the second shape data associated with the length of the flexible instrument and having a shape that corresponds to the portion of the first shape data.

* * * * *